United States Patent
Li et al.

(10) Patent No.: US 12,153,537 B2
(45) Date of Patent: Nov. 26, 2024

(54) CONTROL METHOD AND APPARATUS

(71) Applicant: Huawei Technologies Co., Ltd., Shenzhen (CN)

(72) Inventors: Chao Li, Chengdu (CN); Pengxin Bao, Chengdu (CN); Xingxin Zhang, Chengdu (CN); Xuehuan Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 103 days.

(21) Appl. No.: 17/856,169

(22) Filed: Jul. 1, 2022

(65) Prior Publication Data

US 2022/0335002 A1  Oct. 20, 2022

Related U.S. Application Data

(63) Continuation of application No. PCT/CN2020/070145, filed on Jan. 2, 2020.

(51) Int. Cl.
*G06F 13/42* (2006.01)
*G06F 13/362* (2006.01)
*G06F 13/40* (2006.01)

(52) U.S. Cl.
CPC ........ *G06F 13/4282* (2013.01); *G06F 13/362* (2013.01); *G06F 13/404* (2013.01)

(58) Field of Classification Search
CPC .................................................... Y02D 10/00
See application file for complete search history.

(56) References Cited

U.S. PATENT DOCUMENTS

| | | | |
|---|---|---|---|
| 2013/0058444 A1 | 3/2013 | Tang et al. | |
| 2013/0124763 A1 | 5/2013 | Kessler | |
| 2016/0034416 A1* | 2/2016 | Chavez | G06F 13/364 |
| | | | 381/59 |
| 2016/0034417 A1 | 2/2016 | Chavez et al. | |
| 2017/0308488 A1 | 10/2017 | Hindle et al. | |
| 2018/0181507 A1* | 6/2018 | Foust | G06F 13/24 |

FOREIGN PATENT DOCUMENTS

| | | |
|---|---|---|
| CN | 102012885 A | 4/2011 |
| CN | 105119794 A | 12/2015 |
| CN | 105786734 A | 7/2016 |
| CN | 205665661 U | 10/2016 |
| CN | 106878125 A | 6/2017 |
| CN | 107656773 A | 2/2018 |
| TW | 201536605 A | 10/2015 |

* cited by examiner

*Primary Examiner* — Henry Tsai
*Assistant Examiner* — Juanito C Borromeo
(74) *Attorney, Agent, or Firm* — Conley Rose, P.C.

(57) ABSTRACT

A control method includes, after determining a target device to be controlled, a host sends indication information, a control command, and an address of a register of the target device to a control device through an Inter-Integrated Circuit (I2C) interface, so that the control device encapsulates the indication information, the control command, and the address of the register of the target device, and sends the indication information, the control command, and the address of the register of the target device that are encapsulated to a slave device connected to the control device.

20 Claims, 8 Drawing Sheets

CONTROL METHOD AND APPARATUS

CROSS-REFERENCE TO RELATED APPLICATIONS

This is a continuation of International Patent Application No. PCT/CN2020/070145 filed on Jan. 2, 2020, the disclosure of which is hereby incorporated by reference in its entirety.

TECHNICAL FIELD

This disclosure relates to the field of electronic communication technologies, and in particular, to a control method and apparatus.

BACKGROUND

An Inter-Integrated Circuit ($I^2C$) bus is a bidirectional serial bus, and is configured to connect a microcontroller and a peripheral device of the microcontroller. The $I^2C$ bus has two signal lines, where one is a serial data line (SDA), and the other is a serial clock line (SCL). Data lines of all devices connected to the $I^2C$ bus are connected to the SDA in the $I^2C$ bus, and clock lines of all the devices connected to the $I^2C$ bus are connected to the SCL of the $I^2C$ bus.

The $I^2C$ bus may be applied to a plurality of possible scenarios, for example, may be applied to a vehicle-mounted audio system. The vehicle-mounted audio system may include an audio processing (e.g., a digital signal processor (DSP)) device, a transmission system, and a peripheral device connected to the transmission system. The transmission system may include a plurality of transmission devices. A host may be connected to one transmission device through the $I^2C$ bus. Further, using a daisy chain topology leads to reduction in a length of a connection cable, cabling difficulty, and a quantity of DSP devices, and improves flexibility of device deployment. Therefore, the daisy chain topology is usually used to connect the plurality of transmission devices in the transmission system because space in a vehicle is very limited.

However, when a complex topology such as the daisy chain topology is used, how to implement control on the transmission device and/or the peripheral device by the DSP device still needs to be further studied at present.

SUMMARY

In view of this, this disclosure provides a control method and apparatus, to implement quick control on a slave device and/or a peripheral device.

According to a first aspect, an embodiment of this disclosure provides a control method, where the control method is applicable to a host, and the host is connected to a control device through an $I^2C$ bus. In this method, the host determines a target device that needs to be controlled, where the target device includes at least one of P slave devices and/or at least one of N peripheral devices, and at least one of the P slave devices and the control device is connected to the N peripheral devices, the host sends a start signal to the control device, the host sends indication information, a control command, and an address of a register of the target device to the control device, where the indication information is used to indicate the target device, and the control command is a read command or a write command, and the host sends a stop signal to the control device. P and N are integers greater than or equal to 1.

In the foregoing method, after sending the start signal and before sending the stop signal, the host sends the indication information, the control command, and the address of the register of the target device to the control device. In this way, transmission efficiency can be effectively improved, and quick control on the target device (for example, the slave device and/or the peripheral device) can be implemented. It should be noted that a sequence in which the host sends the indication information, the control command, the address of the register of the target device, and the like is not limited in embodiments of this disclosure.

In a possible design, the target device is a first peripheral device in the N peripheral devices, and the indication information includes an identifier of a device connected to the first peripheral device, and further includes an index of an address of the first peripheral device or the address of the first peripheral device.

In a possible design, the target device is a first slave device in the P slave devices, and the indication information includes an identifier of the first slave device.

In a possible design, the indication information further includes a preset index or a preset address.

In a possible design, that the host sends indication information to the control device includes that the host obtains mapping relationship information, where the mapping relationship information includes a mapping relationship between identifier information, index information, and address information, or the mapping relationship information includes a mapping relationship between the identifier information and the address information, where the identifier information includes identifiers of the P slave devices, the index information includes indexes of addresses of the N peripheral devices, and the address information includes the addresses of the N peripheral devices, and the host sends the indication information to the control device based on the mapping relationship information.

According to the foregoing method, the host may determine, based on the mapping relationship information, content included in the indication information that is used for indicating the target device. This effectively ensures that the target device is accurately indicated. For example, a manner in which the indication information indicates the target device may be predefined, or may be pre-agreed on by the host, the control device, and the slave device.

In a possible design, when the mapping relationship information includes the mapping relationship between the identifier information, the index information, and the address information, an identifier of each slave device of the P slave devices, an address of a peripheral device connected to the slave device, and an index of the address of the peripheral device connected to the slave device correspond, or when the mapping relationship information includes the mapping relationship between the identifier information and the address information, the identifier of each slave device of the P slave devices and the address of the peripheral device connected to the slave device correspond.

In a possible design, the index information further includes a preset index, and the address information further includes a preset address.

In a possible design, if the control command is the read command, before that the host sends a stop signal to the control device, the method further includes that the host receives first data sent by the control device, where the first data is data from the target device. If the control command is the write command, before that the host sends a stop signal to the control device, the method further includes that the host sends second data to the control device.

According to a second aspect, an embodiment of this disclosure provides a control method. The control method is applicable to a control device that is connected to a host through an I²C bus. In the control method, the control device receives indication information, a control command, and an address of a register of a target device from the host, where the indication information is used to indicate the target device, the control command is a read command or a write command, the target device includes at least one of P slave devices and/or at least one of N peripheral devices, and the N peripheral devices are connected to at least one of the P slave devices, and the control device sends a first message to a slave device connected to the control device, where the first message includes the indication information, the control command, and the address of the register of the target device. P and N are integers greater than or equal to 1.

According to the foregoing method, a control device may send indication information, a control command, and an address of a register of a target device to a slave device by using one message, so that the slave device determines, based on the indication information, whether the target device is the slave device or a peripheral device connected to the slave device. In this way, quick control on the slave device or the peripheral device can be implemented. The method has strong adaptability. For example, the method is applicable to various complex topologies.

In a possible design, the target device is a first peripheral device in the N peripheral devices, and the indication information includes an identifier of a device connected to the first peripheral device, and further includes an index of an address of the first peripheral device or the address of the first peripheral device.

In a possible design, the method further includes that the control device writes the identifier of the device connected to the first peripheral device and the control command into a same register, or the control device writes the index of the address of the first peripheral device or the address of the first peripheral device and the control command into a same register.

According to the foregoing method, the identifier of the device connected to the first peripheral device and the control command occupy one register, or the index of the address of the first peripheral device or the address of the first peripheral device and the control command occupy one register. In this way, a register resource can be effectively saved, a quantity of bits transmitted by the host to the control device can be reduced, and transmission efficiency can be improved.

In a possible design, the target device is a first slave device in the P slave devices, and the indication information includes an identifier of the first slave device.

In a possible design, the indication information further includes a preset index or a preset address.

In a possible design, the method further includes that the control device writes the identifier of the first slave device and the control command into a same register, or the control device writes the preset index or the preset address and the control command into a same register.

In a possible design, that the control device receives indication information, a control command, and an address of a register of a target device from the host includes that the control device receives a start signal from the host, the control device receives the indication information, the control command, and the address of the register of the target device from the host, and the control device receives a stop signal from the host.

In the foregoing method, after sending the start signal and before sending the stop signal, the host sends the indication information, the control command, and the address of the register of the target device to the control device. In this way, transmission efficiency can be effectively improved, and quick control on the target device (for example, the slave device and/or the peripheral device) can be implemented.

In a possible design, if the control command is the read command, the method further includes that the control device receives first data from the target device, and sends the first data to the host. If the control command is the write command, the method further includes that the control device receives second data from the host, where the first message further includes the second data.

According to a third aspect, an embodiment of this disclosure provides a control method, where the control method is applied to a first slave device. According to the control method, a first slave device receives a first message from a control device, where the first message includes indication information, a control command, and an address of a register of a target device, the indication information is used to indicate the target device, the control command is a read command or a write command, the target device includes at least one of P slave devices and/or at least one of N peripheral devices, the N peripheral devices are connected to at least one of the P slave devices, and the first slave device is any of the P slave devices, and if the first slave device determines that the target device is the first slave device, the first slave device performs a first operation based on the control command. P and N are integers greater than or equal to 1.

According to the foregoing method, after receiving a first message from a control device, a slave device may determine, based on indication information, whether a target device is the slave device or a peripheral device connected to the slave device. When the indication information indicates that the target device includes the slave device, the slave device may perform a first operation based on a control command. In this way, quick control on the slave device can be implemented. The method has strong adaptability. For example, the method is applicable to various complex topologies.

In a possible design, that the first slave device determines that the target device is the first slave device includes that, if the first slave device determines that the indication information includes an identifier of the first slave device and a preset index or a preset address, the first slave device determines that the target device is the first slave device.

In a possible design, the method further includes that, if the first slave device determines that the target device is a first peripheral device connected to the first slave device, the first slave device controls the first peripheral device to perform the first operation.

According to the foregoing method, after receiving the first message from the control device, the slave device determines, based on the indication information, that the target device includes the peripheral device connected to the slave device, and may control, based on the control command, the peripheral device to perform the first operation. In this way, quick control on the peripheral device by the host can be implemented.

In a possible design, that the first slave device determines that the target device is the first peripheral device includes that, if the first slave device determines that the indication information includes the identifier of the first slave device and an index of an address of the first peripheral device or the address of the first peripheral device, the first slave device determines that the target device is the first peripheral device.

In a possible design, if the control command is the write command, the first message further includes second data.

In a possible design, if the control command is the write command, the first operation is at least one of a write operation, a memory clearing operation, or a read operation.

In a possible design, connections between the control device and the P slave devices form a daisy chain topology, or a ring topology, or a tree topology.

According to a fourth aspect, this disclosure provides an apparatus. The apparatus has functions of implementing any possible design of the first aspect to the third aspect. For example, the apparatus includes corresponding modules, units, or means of performing the steps in any possible design of the first aspect to the third aspect. The functions, units, or means may be implemented by software, or may be implemented by hardware, or may be implemented by hardware by executing corresponding software.

In a possible design, the apparatus includes a processing unit and a communications unit. The communications unit may be configured to send and receive a signal, to implement communication between the apparatus and another apparatus. The processing unit may be configured to perform some internal operations of the apparatus. Functions performed by a processing unit and a communications unit may correspond to steps in any possible design of the first aspect to the third aspect.

In a possible design, the apparatus includes a processor, and may further include a transceiver. The transceiver is configured to send and receive a signal, and the processor executes program instructions, to complete the method according to any possible design or implementation of the first aspect to the third aspect. The apparatus may further include one or more memories or may be coupled to one or more memories. The one or more memories may be integrated with the processor, or may be separate from the processor. This is not limited in this disclosure. The memory may store a necessary computer program or necessary instructions for implementing the functions in the first aspect to the third aspect. The processor may execute the computer program or the instructions stored in the memory. When the computer program is or the instructions are executed, the apparatus is enabled to implement the method according to any possible design or implementation of the first aspect to the third aspect.

In a possible design, the apparatus includes a processor and a memory. The memory may store a necessary computer program or necessary instructions for implementing the functions in the first aspect to the third aspect. The processor may execute the computer program or the instructions stored in the memory. When the computer program is or the instructions are executed, the apparatus is enabled to implement the method according to any possible design or implementation of the first aspect to the third aspect.

In a possible design, the apparatus includes at least one processor and an interface circuit. The at least one processor is configured to communicate with another apparatus through the interface circuit, and perform the method according to any possible design or implementation of the first aspect to the third aspect.

According to a fifth aspect, an embodiment of this disclosure further provides a communications system. The communications system includes a host, a control device, and one or more slave devices. The host and the control device may be connected through an I²C bus. For example, the control device and the one or more slave devices may be connected to one or more peripheral devices. The host may be configured to perform the method according to any possible design of the first aspect, the control device may be configured to perform the method according to any possible design of the second aspect, and the slave device may be configured to perform the method according to any possible design of the third aspect.

According to a sixth aspect, an embodiment of this disclosure further provides a computer storage medium. The storage medium stores a software program. When the software program is read and executed by one or more processors, the method according to any possible design of the first aspect to the third aspect can be implemented.

According to a seventh aspect, an embodiment of this disclosure further provides a computer program. When the computer program is run on a computer, the computer is enabled to perform the method according to any possible design of the first aspect to the third aspect.

According to an eighth aspect, an embodiment of this disclosure further provides a chip. The chip is configured to read a computer program stored in a memory, to perform the method according to any possible design of the first aspect to the third aspect.

According to a ninth aspect, an embodiment of this disclosure provides a chip system. The chip system includes a processor configured to support a control apparatus in implementing the functions in the foregoing aspects. In a possible design, the chip system further includes a memory. The memory is configured to store program instructions and data that are necessary for the manage device. The chip system may include a chip, or may include a chip and another discrete component.

These aspects or other aspects of this disclosure are clearer and more comprehensible in descriptions of the following embodiments.

DESCRIPTION OF EMBODIMENTS

The following describes technical solutions in embodiments of this disclosure with reference to accompanying drawings. It is clear that the described embodiments are merely some but not all of embodiments of this disclosure.

Figure 1:
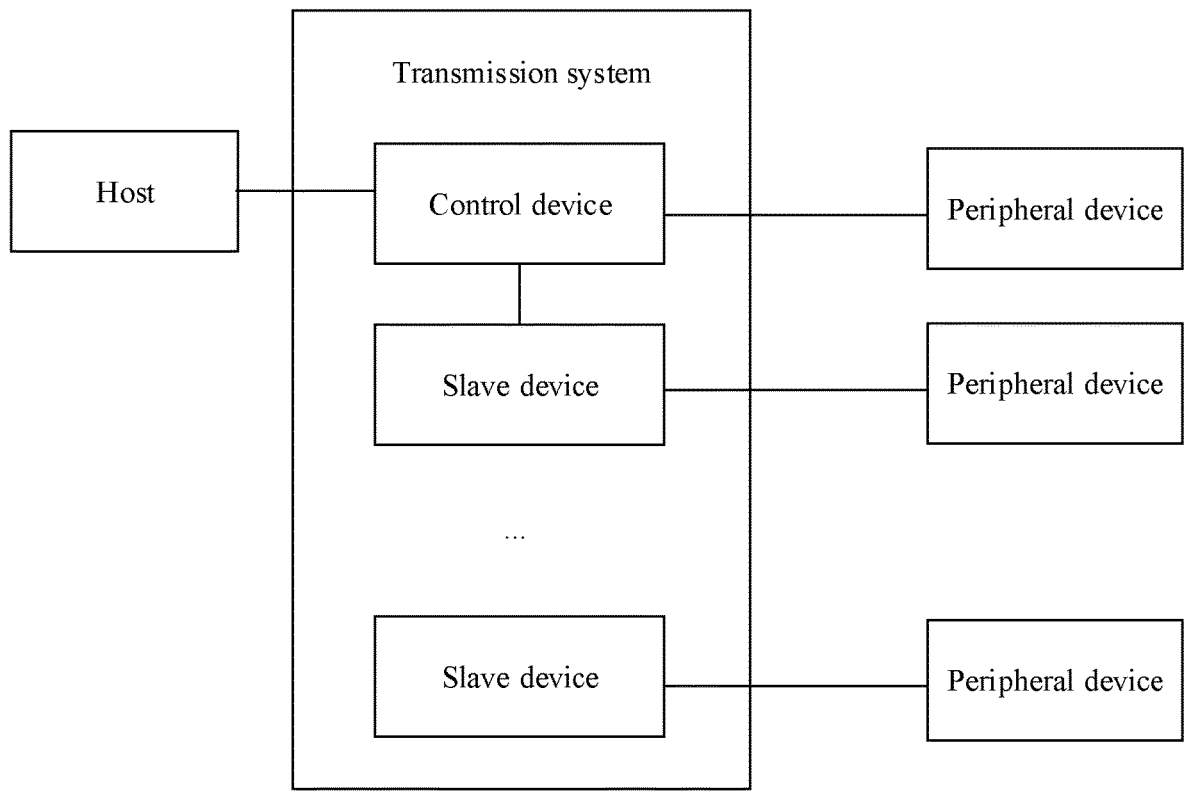
FIG. 1 is a schematic diagram of a possible system architecture to which an embodiment of this disclosure is applicable.

FIG. 1 is a schematic diagram of an architecture of a system to which an embodiment of this disclosure is applicable. As shown in FIG. 1, the system architecture includes a host, a transmission system connected to the host, and one or more peripheral devices connected to the transmission system. The transmission system may include one or more transmission devices. The one or more transmission devices include a control device. Another transmission device other than the control device may be referred to as a slave device. For example, the transmission device may also be referred to as a transmission node or a node, the control device may also be referred to as a master device or a master node, and the slave device may be referred to as a slave node. The peripheral device may also be referred to as a peripheral component, an external component, an external device, or a peripheral.

The following describes a connection relationship and a connection manner between different devices in the system architecture shown in FIG. 1.

For example, the host may be connected to the control device through an I²C (which may also be written as I$^2$C) bus. The control device may be connected to the slave device, and different slave devices may be connected level by level. The control device and the slave device may be connected by a twisted pair (TP), or may be connected in another manner, for example, using a coaxial cable. The slave devices may be connected by a twisted pair, or may be connected in another manner, for example, using a coaxial cable. This is not limited.

A transmission device (for example, a control device or a slave device) may be connected to a peripheral device through one or more I2C buses. Take a transmission device 1 as an example. The transmission device 1 may be connected to one peripheral device through one I2C bus, or connected to a plurality of peripheral devices through one I2C bus, or connected to a plurality of peripheral devices through a plurality of I2C buses. It should be noted that in the one or more transmission devices, there may be some transmission devices that are not connected to a peripheral device. For example, the control device may be connected to a peripheral device, or may not be connected to a peripheral device, and the slave device may be connected to a peripheral device, or may not be connected to a peripheral device. In this embodiment of this disclosure, an example in which the one or more transmission devices are all connected to peripheral devices is used for description.

The following describes the foregoing devices to help a person skilled in the art have a better understanding.

Host: A host can control a transmission device in a transmission system and a peripheral device. For example, the host may perform read/write control on the transmission device in the transmission system. For another example, the host may perform read/write control on the peripheral device connected to the transmission system. In addition, the host may further implement other functions, which are not enumerated herein one by one. For example, the host may include a processor. The processor may be a general-purpose central processing unit (CPU), a microprocessor, an application-specific integrated circuit (ASIC), or one or more integrated circuits configured to control program execution of the solutions of this disclosure.

Control device: The control device may receive data sent by a host, encapsulate the data sent by the host, and send the encapsulated data to each slave device. The control device may further receive data sent by each slave device, decapsulate the data sent by each slave device, and send the decapsulated data to the host. If the control device is connected to a peripheral device, data may be further transmitted between the control device and the peripheral device, for example, the control device may obtain data collected by the peripheral device and send data to the peripheral device. The control device may further encapsulate the data collected by the peripheral device that is connected to the control device, and send the encapsulated data to the host. The control device may further decapsulate the data sent by the host, and send the decapsulated data to the connected peripheral device. In addition, the control device may further implement other functions, which are not enumerated herein one by one.

Slave device: The slave device may obtain data collected by a peripheral device and send the data to a control device, and may further send data sent by the control device to the connected peripheral device. If the slave device is an intermediate node in a daisy chain, the slave device may further forward the data sent by a lower-level slave device to the control device, or forward the data sent by the control device to the lower-level slave device. In addition, the slave device may further implement other functions, which are not enumerated herein one by one.

Peripheral device: The peripheral device may include at least one of a microphone, a millimeter wave radar, a laser radar, an ultrasonic radar, a camera, a positioning system, an inertial sensor, a speed sensor, an acceleration sensor, a humidity sensor, and a light intensity sensor. The peripheral device may further include a play device such as a display, an external power amplifier, or a speaker. In another possible embodiment, the peripheral device may further include other possible devices, which are not enumerated herein one by one.

It should be noted that: (1) Network elements such as the host, the control device, and the slave device in embodiments of this disclosure may be logical concepts or entity concepts. For example, forms of the network elements such as the host, the control device, and the slave device may be entity devices. Further, the plurality of network elements may be a plurality of entity devices, or the plurality of network elements may be integrated into one entity device. For example, a slave device 1 and a slave device 2 may be on one circuit board. For another example, the forms of the network elements such as the host, the control device, and the slave device may alternatively be circuit boards, chips on a circuit board, or functions implemented by a chip area on a circuit board. (2) The system architecture described in FIG. 1 is applicable to a plurality of possible scenarios, for example, applicable to an in-vehicle audio system. When the foregoing system architecture is applied to the in-vehicle audio system, the host may be a DSP device, and the peripheral device may include a microphone (MIC) array, a speaker (SPK), or the like.

Based on the system architecture shown in FIG. 1, an example in which the system architecture includes P slave devices and N peripheral devices is used, where both P and N are integers greater than or equal to 1, and P may be greater than N, or may be less than N, or may be equal to N. The P slave devices may be a slave device 0, a slave device 1, a slave device 2, . . . , and a slave device P−1, where 0, 1, 2, . . . , and P−1 may be understood as numbers allocated to the slave devices. In this embodiment of this disclosure, a number may also be allocated to the control device. For example, the number allocated to the control device is P. It should be noted that there may be a plurality of possible implementations for numbering the control device and the slave device. For example, if a start number allocated to the slave devices is 1, the number allocated to the control device may be 0. The N peripheral devices may be a peripheral device 0, a peripheral device 1, a peripheral device 2, . . . , and a peripheral device N−1, where 0, 1, 2, . . . , and N−1 may be understood as numbers allocated to the peripheral devices.

Figure 2A:
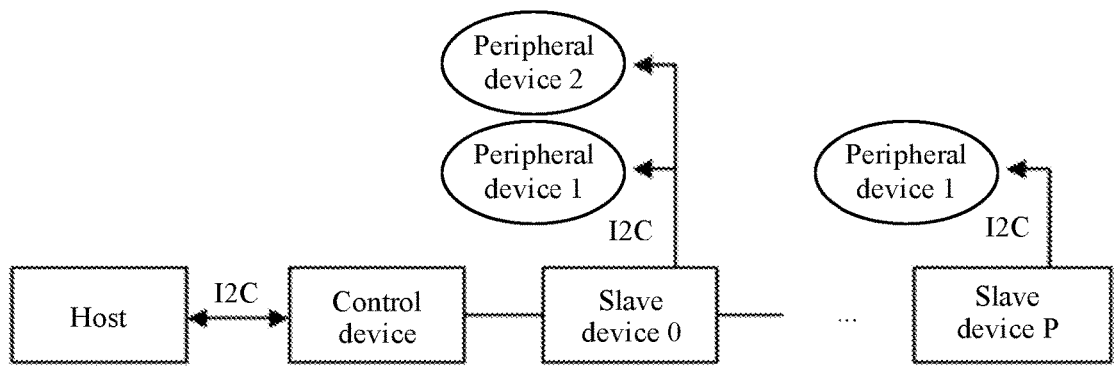
FIG. 2A is a schematic diagram of a daisy chain topology according to an embodiment of this disclosure.
Figure 2B:
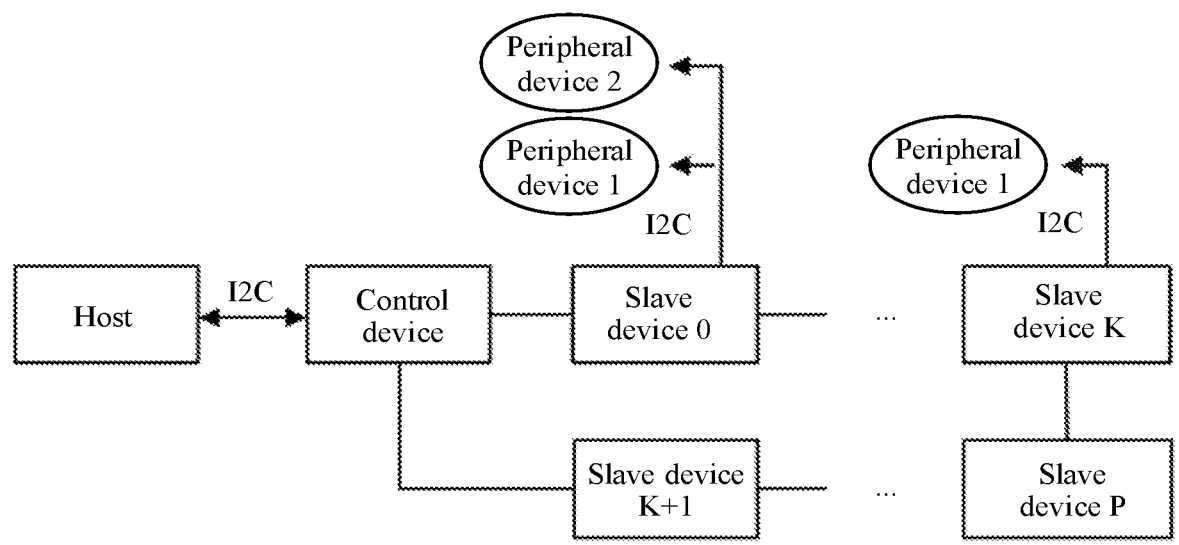
FIG. 2B is a schematic diagram of a ring topology according to an embodiment of this disclosure.

For example, when the transmission system includes a large quantity of transmission devices, connections between the plurality of transmission devices may constitute a plurality of possible topologies, for example, a daisy chain topology shown in FIG. 2A, a ring topology shown in FIG. 2B, or a tree topology.

Figure 3:
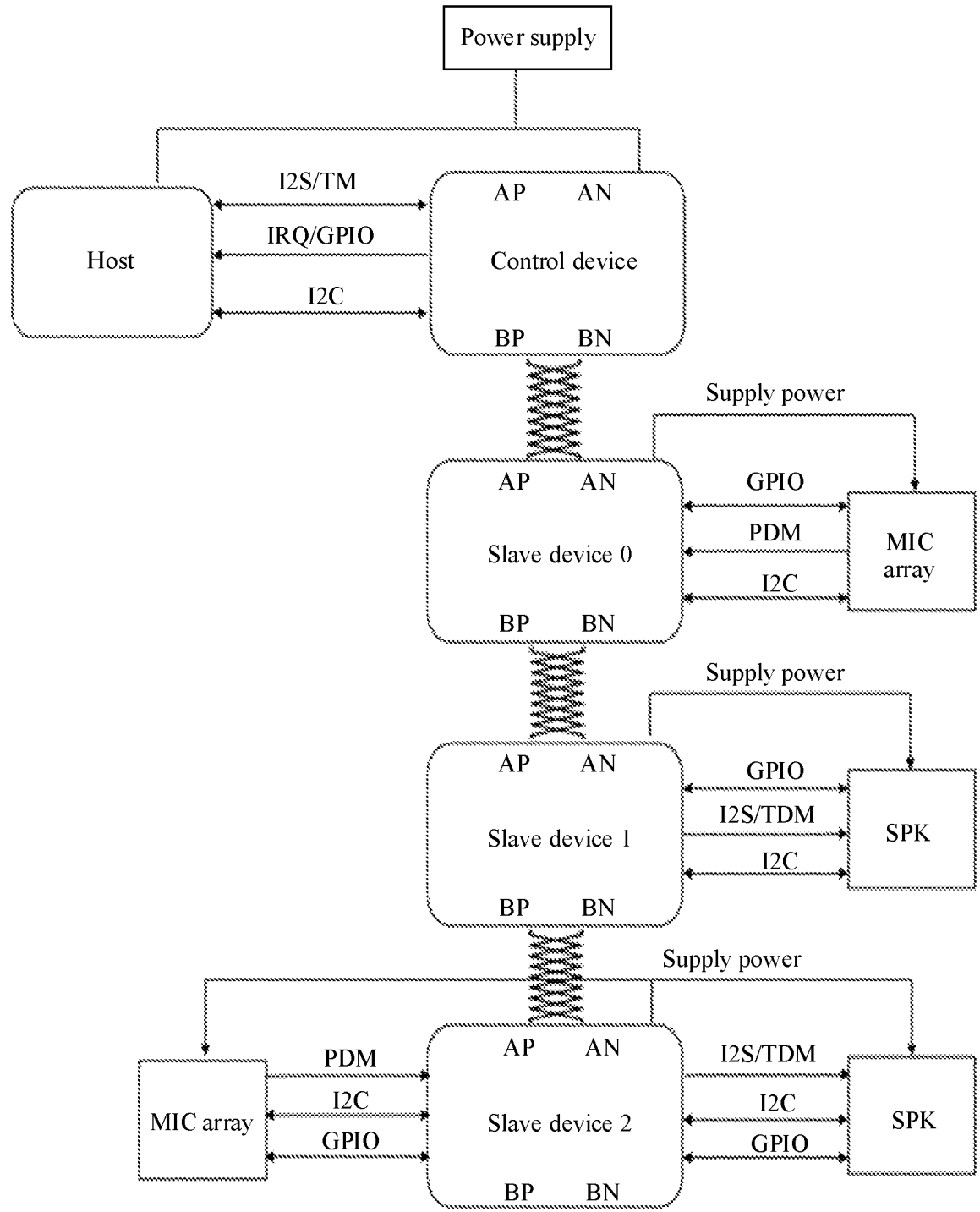
FIG. 3 is a schematic diagram of another possible system architecture to which an embodiment of this disclosure is applicable.

For ease of describing embodiments of this disclosure, the following describes a possible system architecture by using an example in which P=3 and N=4. The system architecture is applicable to an in-vehicle audio system. Refer to FIG. 3. A host and a control device are connected by an I2C bus. In addition, the host and the control device may also be connected by an I2C Sound (I2S) interface/a time-division multiplexing (TDM) interface/a pulse code modulation (PCM) interface/a pulse density modulation (PDM) interface/a general-purpose input/output (GPIO) interface. The control device is connected to a slave device 0 by using a twisted pair, the slave device 0 is connected to a slave device 1 by using a twisted pair, and the slave device 1 is connected to a slave device 2 by using a twisted pair. The slave device 0 is connected to a peripheral device 1 (for example, a MIC array) through an I2C bus, the slave device 1 is connected to a peripheral device 2 (for example, an SPK) through an I2C bus, and the slave device 2 is connected to a peripheral device 3 (for example, an SPK) and a peripheral device 4 (for example, a MIC array) through an I2C bus. In addition, a transmission device may be connected to a peripheral device through an I2S/TDM/PCM/PDM/GPIO interface. The slave device 0 may be understood as an upper-level transmission device of the slave device 1, and correspondingly, the slave device 1 may be understood as a lower-level transmission device of the slave device 0. The slave device 1 may be understood as an upper-level transmission device of the slave device 2, and correspondingly, the slave device 2 may be understood as a lower-level transmission device of the slave device 1.

For example, the control device may be further connected to a power supply, where the power supply supplies power to the control device, the control device may supply power to the slave devices, and each transmission device may supply power to a peripheral connected to the transmission device. The control device may be connected to the power supply through an AP/AN interface or another interface. An upper-level transmission device can be connected to an AP/AN interface of a lower-level transmission device through a BP/BN interface, to implement electrical transmission and signal transmission between the upper-level and lower-level transmission devices.

Take the system architecture shown in FIG. 3 as an example. The host may be configured to process data transmitted by the peripheral devices such as a microphone, for example, perform processing such as filtering and noise reduction on voice data collected by the microphone. The control device may be configured to encapsulate data processed by a processor and send the encapsulated data to each slave device, and the control device may further receive data sent by each slave device, decapsulate the data, and send the decapsulated data to the host. The slave device may be configured to send data collected by the peripheral device to the control device, and may further receive the data from the control device. To be specific, a downlink data stream such as audio may be sent by the host to the control device, then sent by the control device to each slave device, and then transmitted by the slave device to the peripheral device. A transmission path of the downlink data stream may be described as Slave 2→Slave 1→Slave 0→Master→DSP. An uplink data stream such as audio is collected by the microphone and transmitted to the slave device. The slave device sends the uplink data stream to the control device. The control device forwards the uplink data stream to the DSP. A transmission path may be described as Slave 2→Slave 1→Slave 0→Master→DSP. In addition to a data stream, the host also needs to control the control device, the slave devices, and the peripheral devices. For example, the host may control the control device through an I2C interface. However, how to quickly control the slave devices and the peripheral devices by the host still needs to be further studied.

Based on this, embodiments of this disclosure provide a control method, to implement quick control on a slave device and/or a peripheral device.

The following first describes related technical features in embodiments of this disclosure. It should be noted that these explanations are intended to make embodiments of this disclosure easier to understand, but should not be considered as a limitation on the protection scope claimed in this disclosure.

(1) I2C Communication:

In an I2C bus communications architecture, a plurality of devices may share a bus in hardware. For example, one I2C master component and one or more I2C slave components may share a same I2C bus, that is, one I2C master component and one or more I2C slave components are all connected to the I2C bus through an SCL and an SDA. Different I2C slave components may be distinguished by addresses. In other words, each I2C slave component may have a unique address, and the address may include seven bits or ten bits. In this embodiment of this disclosure, an example in which the address includes seven bits is used for description. Because the I2C master component shares the same I2C bus with one or more I2C slave components, the I2C master component needs to select a slave component for communication through addressing during communication.

There are three types of signals during communication between the I2C master component and the I2C slave component: a start signal, a stop signal, and an acknowledgement (ACK) signal. start signal: When SCL remains at a high level, an SDA falling edge occurs, the start signal is used for starting I2C bus communication, and after the start signal appears, an I2C bus is considered "busy", so that subsequent I2C bus addressing, data transmission, or the like may be performed. stop signal: When SCL remains at a high level, an SDA rising edge occurs, the stop signal is used for terminating I2C bus communication, and after the stop signal appears, the bus is considered "idle". ACK signal: After receiving eight-bit data, a component that receives data sends a specific low-level pulse to a component that sends data, indicating that the data is received.

Communication between the I2C master component and the I2C slave component may include control performed by the I2C master component on the I2C slave component to read data (that is, a read process), and may further include control performed by the I2C master component on the I2C slave component to write data (that is, a write process). The following separately describes the read process and the write process.

A possible write process of the I2C bus may include the following steps.

Step 1. An I2C master component sends a start signal.

Step 2. The I2C master component sends a byte and waits for an ACK. First seven bits of the byte carry an address (I2C ADDR) of a to-be-controlled I2C slave component, and a last bit is a read/write (R/W) control bit. If the read/write control bit is 1, it indicates a read command. If the read/write control bit is 0, it indicates a write command.

Step 3: The I2C slave component (the I2C slave component is the to-be-controlled I2C slave component) sends an ACK.

Step 4. The I2C master component sends a byte and waits for an ACK. The byte carries an address of a register (for example, a register 1) of the I2C slave component.

Step 5. The I2C slave component sends an ACK.

Step 6. The I2C master component sends a byte and waits for an ACK. The byte carries data to be written into the I2C slave component.

Step 7. The I2C slave component writes the data into the register 1 and sends an ACK.

Step 8. The I2C master component sends a stop signal.

It should be noted that the foregoing Step 6 and Step 7 may be performed continuously, that is, the data is written into the register in sequence.

A read process of the I2C bus may include two processes. In a process 1, a register address is set, and in a process 2, register data is read. A possible read process may include the following steps.

Step 1. An I2C master component sends a start signal.

Step 2. The I2C master component sends an I2C ADDR (seven bits) and a write command (one bit), and waits for an ACK.

Step 3. The I2C slave component sends an ACK.

Step 4. The I2C master component sends an address (eight bits) of a register (for example, a register 1) carrying the I2C slave component, and waits for an ACK.

Step 5. The I2C slave component sends an ACK.

Step 6. The I2C master component sends a stop signal.

Step 7. An I2C bus is initialized.

Step 8. The I2C master component sends a start signal.

Step 9. The I2C master component sends the I2C ADDR (seven bits) and a read command (one bit), and waits for an ACK.

Step 10. The I2C slave component sends an ACK.

Step 11. The I2C slave component sends the data (eight bits) stored in the register 1 and waits for an ACK.

Step 12. The I2C master component sends an ACK.

Step 13. The I2C master component sends a stop signal.

For example, in the system architecture shown in FIG. 1 or FIG. 3, the host may be an I2C master component, the control device may be an I2C slave component, the transmission device may be an I2C master component, and the peripheral device connected to the transmission device may be an I2C slave component.

(2) Register:

The I2C master component or the I2C slave component may include a plurality of registers, and each register in the plurality of registers may store one byte, that is, eight bits. The plurality of registers may include one or more control registers. For example, the plurality of registers includes a control register 1 and a control register 2. When 00000001 is written into the control register 1, it indicates that a memory clearing operation needs to be performed. When 00000001 is written into the control register 2, it indicates that a reset operation needs to be performed. For another example, the plurality of registers includes a control register 3. When 00000001 is written into the control register 3, it indicates that a memory clearing operation needs to be performed. When 00000010 is written into the control register 3, it indicates that a reset operation needs to be performed.

Figure 4:
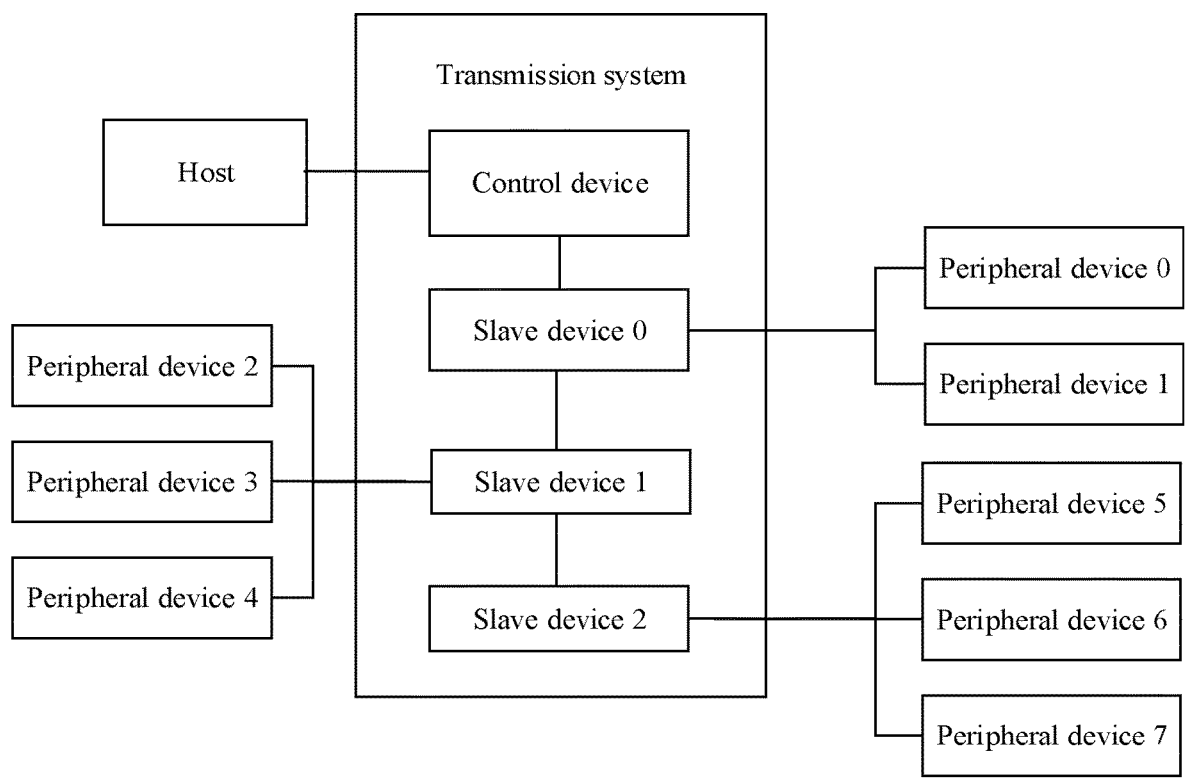
FIG. 4 is a schematic diagram of still another possible system architecture to which an embodiment of this disclosure is applicable.

The following describes an example in which a system architecture to which embodiments of this disclosure are applicable and which includes a host, P+1 transmission devices (including a control device and P slave devices), and N peripheral devices (the N peripheral devices are connected to at least one of the P slave devices), where P=3, and N=7. Refer to FIG. 4. A slave device 0 is connected to a peripheral device 0 and a peripheral device 1, a slave device 1 is connected to a peripheral device 2, a peripheral device 3, and a peripheral device 4, and a slave device 2 is connected to a peripheral device 5, a peripheral device 6, and a peripheral device 7.

In the control method provided in embodiments of this disclosure, after determining a target device that needs to be controlled, the host may send indication information, a control command, and an address of a register of the target device to the control device through an I2C interface, so that the control device may encapsulate the indication information, the control command, and the address of the register of the target device, and send the indication information, the control command, and the address of the register of the target device that are encapsulated to a slave device connected to the control device. If the target device is a slave device, the slave device may perform a first operation according to the control command. If the target device is a peripheral device, a slave device connected to the peripheral device may control the peripheral device to perform the first operation. According to this method, a control device may send indication information, a control command, and an address of a register of a target device to a slave device by using one message (in other words, at one time), so that the slave device determines, based on the indication information, whether the target device is the slave device or a peripheral device connected to the slave device. In this way, quick control on the slave device or the peripheral device can be implemented. The method has strong adaptability. For example, the method is applicable to various complex topologies. In addition, when the target device needs to be switched, the foregoing method may be implemented again, and therefore switching efficiency is high.

For example, the host may obtain first mapping relationship information, and send the indication information to the control device based on the first mapping relationship information. It may be understood that the first mapping relationship information may be stored in the host, or may be stored in a storage apparatus that is independent of the host and that can be accessed by the host.

In a possible implementation (referred to as an implementation 1), the host stores the first mapping relationship information, and further, the transmission device (for example, a slave device) may store second mapping relationship information. It may be understood that the second mapping relationship information may be stored in a storage apparatus that is independent of the transmission device and that can be accessed by the transmission device.

The following describes the first mapping relationship information and the second mapping relationship information.

(1) First Mapping Relationship Information:

The first mapping relationship information may include a mapping relationship among identification information, index information, and address information. The identification information may include identifiers of the P (P=3) slave devices, where the identifier of the slave device may be a number allocated to the slave device, or other information that can identify the slave device. In embodiments of this disclosure, an example in which the identifier of the slave device is a number is used for description. The identification information may further include a preset number (including a first preset number and a second preset number), for example, a number 3. The index information may include indexes of addresses of the N (N=7) peripheral devices, and may further include preset indexes (including a first preset index, a second preset index, and a third preset index), for example, an index 3 corresponding to the slave device 0, an index 4 corresponding to the slave device 1, and an index 4 corresponding to the slave device 2. The address information may include addresses of the N peripheral devices. For descriptions of the preset number and the preset index, refer to the following descriptions.

For example, the identifier of each slave device of the P slave devices, the addresses of the one or more peripheral devices connected to the slave device, and the indexes of the addresses of the one or more peripheral devices connected to the slave device correspond. Table 1 shows an example of the first mapping relationship information.

TABLE 1

First mapping relationship information example 1

| Identification information (for example, an identifier of a slave device) | Address information (for example, an address of a peripheral device) | Index information (for example, an index of an address of a peripheral device) |
|---|---|---|
| 0 (slave device 0) | PER-1 (address of a peripheral device 0) | 1 |
|  | PER-2 (address of a peripheral device 1) | 2 |
| 1 (slave device 1) | PER-1 (address of a peripheral device 2) | 1 |
|  | PER-2 (address of a peripheral device 3) | 2 |
|  | PER-3 (address of a peripheral device 4) | 3 |
| 2 (slave device 2) | PER-1 (address of a peripheral device 5) | 1 |
|  | PER-2 (address of a peripheral device 6) | 2 |
|  | PER-3 (address of a peripheral device 7) | 3 |

It can be learned from Table 1 that a number of the slave device 0 is 0, a number of the slave device 1 is 1, and a number of the slave device 2 is 2. The identifier of the transmission device may correspond to the addresses of the one or more peripheral devices connected to the transmission device. For example, the number of the slave device 0 corresponds to PER-1 (the address of the peripheral device 0) and PER-2 (the address of the peripheral device 1), the number of the slave device 1 corresponds to PER-1 (the address of the peripheral device 2), PER-2 (the address of the peripheral device 3), and PER-3 (the address of the peripheral device 4), and the number of the slave device 2 corresponds to PER-1 (the address of the peripheral device 5), PER-2 (the address of the peripheral device 6), and PER-3 (the address of the peripheral device 7). The addresses of the plurality of peripheral devices are in one-to-one correspondences with the indexes of the addresses of the plurality of peripheral devices. For example, PER-1 (the address of the peripheral device 0) corresponds to the index 1, and PER-2 (the address of the peripheral device 1) corresponds to the index 2.

It may be understood that, in embodiments of this disclosure, addresses of a plurality of peripheral devices connected to different slave devices may be completely the same or partially the same or completely different, and indexes of the addresses of the plurality of peripheral devices connected to the different slave devices may be completely the same or partially the same or completely different. This is not limited.

It may be understood that the "identifier" in embodiments of this disclosure may also be referred to as an "index". For example, the identifier of the slave device may also be referred to as an index of the slave device. Similarly, the index of the address of the peripheral device may also be referred to as an identifier of the address of the peripheral device or an identifier of the peripheral device. A specific name is not limited in embodiments of this disclosure.

(2) Second Mapping Relationship Information:

The second mapping relationship information may include a mapping relationship between the address information and the index information. The address information may include an address of a peripheral device connected to the transmission device, and the index information may include an index of the address of the peripheral device connected to the transmission device, or may further include a preset index. An address of each peripheral device corresponds to an index of the address of each peripheral device.

For example, each slave device may store the second mapping relationship information. For second mapping relationship information stored in the slave device 0, refer to Table 2. For second mapping relationship information stored in the slave device 1, refer to Table 3. For second mapping relationship information stored in the slave device 2, refer to Table 4.

TABLE 2

Example of the second mapping relationship information stored in the slave device 0

| Address information (for example, an address of a peripheral device) | Index information (for example, an index of an address of a peripheral device) |
|---|---|
| PER-1 (address of a peripheral device 0) | 1 |
| PER-2 (address of a peripheral device 1) | 2 |

TABLE 3

Example of the second mapping relationship information stored in the slave device 1

| Address information (for example, an address of a peripheral device) | Index information (for example, an index of an address of a peripheral device) |
|---|---|
| PER-1 (address of a peripheral device 2) | 1 |
| PER-2 (address of a peripheral device 3) | 2 |
| PER-3 (address of a peripheral device 4) | 3 |

TABLE 4

Example of the second mapping relationship information stored in the slave device 2

| Address information (for example, an address of a peripheral device) | Index information (for example, an index of an address of a peripheral device) |
|---|---|
| PER-1 (address of a peripheral device 5) | 1 |
| PER-2 (address of a peripheral device 6) | 2 |
| PER-3 (address of a peripheral device 7) | 3 |

It should be noted that, in addition to storing the second mapping relationship information, each slave device may further store the number of the slave device and the preset number. For example, the slave device 0 may store the number of the slave device 0 and a preset number, the slave device 1 may store the number of the slave device 1 and a preset number, and the slave device 2 may store the number of slave device 2 and a preset number.

In another possible implementation (referred to as an Implementation 2), the host may store the first mapping relationship information, and further, the transmission device may not store the second mapping relationship information. The first mapping relationship information may include a mapping relationship between the identification information and the address information. The identification information may include numbers of the P (P=3) slave devices, and may further include preset numbers. The address information may include the addresses of the seven peripheral devices, and may further include preset addresses.

For example, the identifier of each slave device of the P slave devices corresponds to the addresses of the one or more peripheral devices connected to the slave device. Refer to Table 5. Table 5 is an example of the first mapping relationship information.

TABLE 5

First mapping relationship information example 2

| Identification information (for example, an identifier of a slave device) | Address information (for example, an address of a peripheral device) |
|---|---|
| 0 (slave device 0) | PER-1 (address of a peripheral device 0) |
| | PER-2 (address of a peripheral device 1) |
| 1 (slave device 1) | PER-1 (address of a peripheral device 2) |
| | PER-2 (address of a peripheral device 3) |
| | PER-3 (address of a peripheral device 4) |
| 2 (slave device 2) | PER-1 (address of a peripheral device 5) |
| | PER-2 (address of a peripheral device 6) |
| | PER-3 (address of a peripheral device 7) |

For the first mapping relationship information described in the foregoing Implementation 1, the indication information sent by the host based on the first mapping relationship information may include two bytes, where one byte (referred to as a byte 1) may indicate the transmission device, and the other byte (referred to as a byte 2) may indicate the peripheral device connected to the transmission device.

For example, if the target device is the peripheral device 3, the byte 1 may include the number of the slave device 1, and the byte 2 may include the index of the address of the peripheral device 3.

For another example, if the target device is the slave device 1, the byte 1 may include the number of the slave device 1, and the byte 2 may include a first preset index (the first preset index may be predefined and does not correspond to an address of any peripheral device connected to the slave device 1, for example, the first preset index may be 4). It may be understood that for different slave devices, first preset indexes may be the same or different. For example, for the slave device 0, the first preset index may be 3, for the slave device 1, the first preset index may be 4, and for the slave device 2, the first preset index may be 4.

For another example, if the target device includes all the slave devices (that is, the slave device 0, the slave device 1, and the slave device 2), the byte 1 may include the first preset number (the first preset number may be predefined and is not a number of any slave device, for example, the first preset number is 3), and the byte 2 may include the second preset index (the second preset index may be predefined and does not correspond to an address of any peripheral device, for example, the second preset index may be 4).

For another example, if the target device includes all the peripheral devices (that is, the peripheral device 1 to the peripheral device 7), the byte 1 may include the second preset number (the second preset number may be predefined and is not a number of any slave device, for example, the second preset number is 3), and the byte 2 may include the third preset index (the third preset index may be predefined, does not correspond to an address of any peripheral device, and is different from the first preset index and the second preset index, for example, the third preset index may be 5).

For another example, if the target device includes all the slave devices and all the peripheral devices (that is, the slave device 0 to the slave device 2 and the peripheral device 1 to the peripheral device 7), the byte 1 may include a third preset number (the third preset number may be predefined and is not a number of any slave device, for example, the third preset number is 3), and the byte 2 may include a fourth preset index (the fourth preset index may be predefined, does not correspond to an address of any peripheral device, and is different from the first preset index, the second preset index, and the third preset index, for example, the fourth preset index may be 6).

Refer to Table 6. Table 6 shows a plurality of possible examples in which the indication information indicates the target device.

TABLE 6

A plurality of possible examples in which the indication information indicates the target device

| Byte 1 | Byte 2 | Indicated target device |
|---|---|---|
| 0 | 1 | Peripheral device 0 |
| 0 | 2 | Peripheral device 1 |
| 1 | 1 | Peripheral device 2 |
| 1 | 2 | Peripheral device 3 |
| 1 | 3 | Peripheral device 4 |
| 2 | 1 | Peripheral device 5 |
| 2 | 2 | Peripheral device 6 |
| 2 | 3 | Peripheral device 7 |
| 0 | 3 (first preset index) | Slave device 0 |
| 1 | 4 (first preset index) | Slave device 1 |
| 2 | 4 (first preset index) | Slave device 2 |
| 3 (first preset number) | 4 (second preset index) | Slave device 0 to slave device 2 |
| 3 (second preset number) | 5 (third preset index) | Peripheral device 1 to peripheral device 7 |
| 3 (third preset number) | 6 (fourth preset index) | Slave device 0 to slave device 2, and peripheral device 1 to peripheral device 7 |

In another possible example, the indication information may include one byte or two bytes. For example, if the target device is the transmission device, the indication information may include the byte 1 and does not include the byte 2. For example, if the target device is the slave device 0, the indication information may include the byte 1 and does not include the byte 2, and the byte 1 may include the number of the slave device 0, that is, 0, if the target device is the slave device 1, the indication information may include the byte 1 and does not include the byte 2, and the byte 1 may include the number of the slave device 1, that is, 1, if the target device is the slave device 2, the indication information may include the byte 1 and does not include the byte 2, and the byte 1 may include the number of the slave device 2, that is, 2. In another case, the indication information may include two bytes. Refer to Table 7. Table 7 shows a plurality of possible examples in which the indication information indicates the target device.

TABLE 7

A plurality of possible examples in which the indication information indicates the target device

| Byte 1 | Byte 2 | Indicated target device |
|---|---|---|
| 0 | 1 | Peripheral device 0 |
| 0 | 2 | Peripheral device 1 |
| 1 | 1 | Peripheral device 2 |
| 1 | 2 | Peripheral device 3 |
| 1 | 3 | Peripheral device 4 |
| 2 | 1 | Peripheral device 5 |
| 2 | 2 | Peripheral device 6 |
| 2 | 3 | Peripheral device 7 |
| 0 | Not include byte 2 | Slave device 0 |
| 1 | Not include byte 2 | Slave device 1 |
| 2 | Not include byte 2 | Slave device 2 |
| 3 (first preset number) | 4 (second preset index) | Slave device 0 to slave device 2 |
| 3 (second preset number) | 5 (third preset index) | Peripheral device 1 to peripheral device 7 |
| 3 (third preset number) | 6 (fourth preset index) | Slave device 0 to slave device 2, and peripheral device 1 to peripheral device 7 |

It should be noted that the indication manners of the indication information provided in Table 6 or Table 7 are merely some possible examples, and a person skilled in the art may make a variation based on an actual requirement. This is not limited in embodiments of this disclosure.

For the first mapping relationship information described in the foregoing Implementation 2, the indication information sent by the host based on the first mapping relationship information may include two bytes, where one byte (referred to as a byte 1) may indicate the transmission device, and the other byte (referred to as a byte 2) may indicate the peripheral device connected to the transmission device.

For example, if the target device is the peripheral device 3, the byte 1 may include the number of the slave device 1, and the byte 2 may include the address of the peripheral device 3.

For another example, if the target device is the slave device 1, the byte 1 may include the number of the slave device 1, and the byte 2 may include a first preset address (the first preset address may be predefined and is not an address of any peripheral device connected to the slave device 1, for example, the first preset index may be PER-3).

For another example, if the target device includes all the slave devices (that is, the slave device 0, the slave device 1, and the slave device 2), the byte 1 may include the first preset number (the first preset number may be predefined and is not a number of any slave device, for example, the first preset number is 3), and the byte 2 may include a second preset address (the second preset address may be predefined and is not an address of any peripheral device, for example, the second preset address may be PER-4).

For another example, if the target device includes all the peripheral devices (that is, the peripheral device 1 to the peripheral device 7), the byte 1 may include the second preset number (the second preset number may be predefined and is not a number of any slave device, for example, the second preset number is 3), and the byte 2 may include a third preset address (the third preset address may be predefined, is not an address of any peripheral device, and is different from the first preset address and the second preset address, for example, the third preset address may be PER-5).

For another example, if the target device includes all the slave devices and all the peripheral devices (that is, the slave device 0 to the slave device 2 and the peripheral device 1 to the peripheral device 7), the byte 1 may include the third preset number (for example, the third preset number is 3), and the byte 2 may include a fourth preset address (the fourth preset address may be predefined, is not an address of any peripheral device, and is different from the first preset address, the second preset address, and the third preset address, for example, the fourth preset index may be PER-6).

Refer to Table 8. Table 8 shows a plurality of possible examples in which the indication information indicates the target device.

TABLE 8

A plurality of possible examples in which the indication information indicates the target device

| Byte 1 | Byte 2 | Indicated target device |
|---|---|---|
| 0 | PER-1 | Peripheral device 0 |
| 0 | PER-2 | Peripheral device 1 |
| 1 | PER-1 | Peripheral device 2 |
| 1 | PER-2 | Peripheral device 3 |
| 1 | PER-3 | Peripheral device 4 |
| 2 | PER-1 | Peripheral device 5 |
| 2 | PER-2 | Peripheral device 6 |
| 2 | PER-3 | Peripheral device 7 |
| 0 | PER-3 (first preset address) | Slave device 0 |
| 1 | PER-4 (first preset address) | Slave device 1 |
| 2 | PER-4 (first preset address) | Slave device 2 |
| 3 (first preset number) | PER-4 (second preset address) | Slave device 0 to slave device 2 |
| 3 (second preset number) | PER-5 (third preset address) | Peripheral device 1 to peripheral device 7 |
| 3 (second preset number) | PER-6 (fourth preset address) | Peripheral device 1 to peripheral device 7 |

It should be noted that, a difference between the indication information sent based on the first mapping relationship information described in Implementation 2 and the indication information sent based on the first mapping relationship information described in Implementation 1 lies in that the byte 2 of the former carries an address, and the byte 2 of the latter carries an index. An example in which the indication information is sent based on the first mapping relationship information described in Implementation 1 is used below for description.

In embodiments of this disclosure, the control command is used to control the target device. For example, the control command may include one bit. If a value of the bit is 1, it indicates a read command. If the value of the bit is 0, it indicates a write command. If the control command is the read command, the first operation may be a read operation. If the control command is the write command, the first operation may be a write operation, a memory clearing operation, or a reset operation. The control command may occupy an independent byte, or the control command may be carried in the byte 1 or the byte 2, so that a quantity of bits that need to be transmitted can be effectively reduced, and transmission efficiency can be improved. An example in which the control command is carried in the byte 1 is used below for description.

Based on the foregoing descriptions, the following describes the control method provided in embodiments of this disclosure with reference to Embodiment 1 to Embodiment 3.

Embodiment 1

Figure 5:
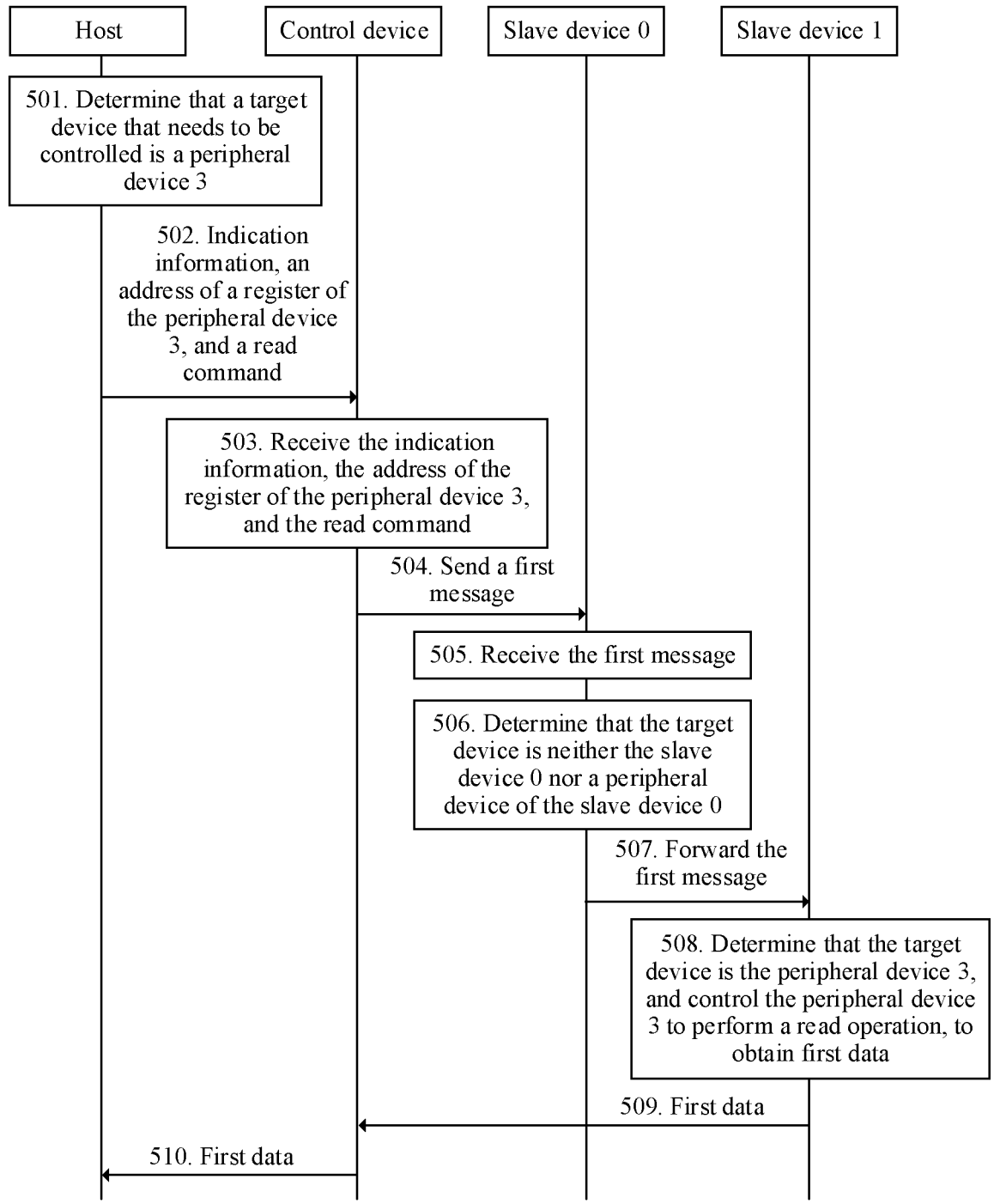
FIG. 5 is a schematic flowchart of a control method according to Embodiment 1 of this disclosure.

In Embodiment 1, a control method provided in this embodiment of this disclosure is described with reference to FIG. 5 by using an example in which the control command is a read command, and the target device is the peripheral device 3. FIG. 5 is a schematic flowchart of the control method according to this embodiment of this disclosure. As shown in FIG. 5, the method includes the following steps.

Step 501. The host determines that the target device that needs to be controlled is the peripheral device 3.

Step 502. The host sends the indication information, the read command, and an address of a register of the peripheral device 3 to the control device, where the indication information is used to indicate the peripheral device 3. Refer to Table 6. The indication information may include a byte 1 and a byte 2, where the byte 1 includes a number 1, and the byte 2 includes an index 2. The read command is used to read first data from the register of the peripheral device 3, and the read command may be carried in the byte 1.

Correspondingly, in Step 503, the control device receives the indication information, the read command, and the address of the register of the peripheral device 3.

Step 504. The control device sends a first message to a slave device connected to the control device (that is, the slave device 0), where the first message includes the indication information, the read command, and the address of the register of the peripheral device 3.

Step 505. The slave device 0 receives the first message from the control device.

Step 506. The slave device 0 determines that the target device is neither the slave device 0 nor a peripheral device (for example, the peripheral device 0 or the peripheral device 1) of the slave device 0.

For example, the slave device 0 may determine, based on the second mapping relationship information stored in the slave device 0, whether the target device is the slave device 0 or the peripheral device of the slave device 0. For example, after receiving the indication information, the slave device 0 may determine whether the number in the byte 1 is the number of the slave device 0 or the preset number. If the number in the byte 1 is neither the number of the slave device 0 nor the preset number, the slave device 0 may not perform a read operation.

Step 507. The slave device 0 forwards the first message to a lower-level transmission device of the slave device 0 (that is, the slave device 1).

It may be understood that the slave device 0 may forward the first message to the lower-level transmission device of the slave device 0 when determining whether the target device is the slave device 0 or the peripheral device of the slave device 0, or the slave device 0 may first forward the first message to the lower-level transmission device of the slave device 0 before determining whether the target device is the slave device 0 or the peripheral device of the slave device 0, or the slave device 0 may forward the first message to the lower-level transmission device of the slave device 0 after the slave device 0 determines that the target device is neither the slave device 0 nor the peripheral device of the slave device 0. This is not limited.

Step 508. The slave device 1 determines that the target device is the peripheral device 3, and controls the peripheral device 3 to perform a read operation, to obtain the first data.

For example, the slave device 1 may determine, based on the second mapping relationship information stored in the slave device 1, whether the target device is the slave device 1 or the peripheral device connected to the slave device 1. For example, after receiving the indication information, the slave device 1 determines that the number in the byte 1 is the number of the slave device 1, may further determine, based on the index carried in the byte 2, an address of the peripheral device that needs to be controlled (that is, PER-3), and may further control, based on the PER-3 and the address of the register of the peripheral device 3 that is carried in the first message, the peripheral device 3 to perform a read operation.

For a process in which the slave device 1 controls the peripheral device 3 to perform the read operation, refer to the foregoing I2C bus read process. Details are not described again.

Step 509. The slave device 1 sends the first data to the control device.

For example, the slave device 1 may first send the first data to the slave device 0, and then the slave device 0 forwards the first data to the control device.

Step 510. The control device sends the first data to the host.

For the foregoing Step 501 to Step 510, the following describes in detail the communication between the host and the control device in this embodiment with reference to Implementation 1 and Implementation 2.

Implementation 1

After sending a start signal and before sending a stop signal, the host may send the indication information, the control command (that is, the read command), and the address of the register of the target device (that is, the peripheral device 3) to the control device, and receive the first data. For example, the communication between the host and the control device may include the following steps.

Step 1. The host sends a start signal to the control device.

Step 2. The host sends the indication information, the control command (that is, the read command), and the address of the register of the peripheral device 3 to the control device.

Step 3. The control device sends the first data to the host.

Step 4. The host sends a stop signal to the control device.

For example, because the host and the control device may communicate through the I2C bus, the following describes, based on an I2C communication process, communication between the host and the control device in detail. For example, the following steps may be included.

Step 1. The host sends a start signal to the control device.

Step 2. The host sends an address of the control device and a write command to the control device, and waits for an ACK. The write command is used to control the control device to perform a write operation.

Step 3. The control device sends an ACK.

Step 4. The host sends an address of a register 1 of the control device to the control device, and waits for an ACK.

Step 5. The control device sends an ACK.

Step 6. The host sends the byte 1 to the control device, and waits for an ACK. The byte 1 may include the number 1 and the read command.

Step 7. The control device sends an ACK.

Herein, the control device may write the content carried in the byte 1 into the register 1.

Step 8. The host sends the byte 2 to the control device, and waits for an ACK. The byte 2 may include the index 2.

Step 9. The control device sends an ACK.

Herein, the control device may write the content carried in the byte 2 into a register 2 of the control device in sequence.

Step 10. The host sends the address of the register of the peripheral device 3 to the control device, and waits for an ACK.

Step 11. The control device sends an ACK.

Herein, after receiving the indication information, the control command, and the address of the register of the peripheral device 3, the control device may perform Step 504 to Step 509, to obtain the first data from the register of the peripheral device 3.

Step 12. The control device sends the first data to the host.

Step 13. The host sends an ACK to the control device.

Step 14. The host sends a stop signal to the control device.

It should be noted that a sequence of sending, by the host, the indication information, the control command, the address of the register of the target device, and the like is not limited in this embodiment of this disclosure. The foregoing steps are described by using an example in which the host first sends the node number and the read command to the control device, sends the index of the address of the target device, and then sends the address of the register of the target device. In another embodiment, another possible sequence may be used. For example, the host first sends the index of the address of the target device to the control device, sends the node number and the read command, and then sends the address of the register of the target device.

In the foregoing Implementation 1, after sending the start signal and before sending the stop signal, the host sends the indication information, the control command, and the address of the register of the target device to the control device. In this way, transmission efficiency can be effectively improved, and quick control on the target device (for example, the slave device and/or the peripheral device) can be implemented.

Implementation 2

In Implementation 2, the host may send the start signal and the stop signal a plurality of times, and information about one or more bytes may be sent between each group of a start signal and a stop signal. For example, the communication between the host and the control device may include the following steps.

Step 1. The host sends a start signal to the control device.

Step 2. The host sends the indication information and the control command to the control device.

Step 3. The host sends a stop signal to the control device.

Step 4. The host sends a start signal to the control device.

Step 5. The host sends the address of the register of the target device (that is, the peripheral device 3) to the control device.

Step 6. The control device sends the first data to the host.

Step 7. The host sends a stop signal to the control device.

The following describes, based on an I2C communication process, communication between the host and the control device in detail. For example, the following steps may be included.

Step 1. The host sends a start signal to the control device.

Step 2. The host sends an address of the control device and a write command to the control device, and waits for an ACK. The write command is used to control the control device to perform a write operation.

Step 3. The control device sends an ACK.

Step 4. The host sends an address of a register 1 of the control device to the control device, and waits for an ACK.

Step 5. The control device sends an ACK.

Step 6. The host sends the byte 1 to the control device, and waits for an ACK. The byte 1 may include the number 1 and the read command.

Step 7. The control device sends an ACK.

Herein, the control device may write the content carried in the byte 1 into the register 1.

Step 8. The host sends the byte 2 to the control device, and waits for an ACK. The byte 2 may include the index 2.

Step 9. The control device sends an ACK.

Herein, the control device may write the content carried in the byte 2 into a register 2 of the control device in sequence.

Step 10. The host sends a stop signal to the control device.

Step 11. The host sends a start signal to the control device.

Step 12. The host sends the address of the register of the peripheral device 3 to the control device and waits for an ACK.

Step 13. The control device sends an ACK.

Step 14. The control device sends the first data to the host.

Step 15. The host sends an ACK to the control device.

Step 16. The host sends a stop signal to the control device.

In Implementation 2, the host may send the start signal and the stop signal for a plurality of times, and send information about one or more bytes between each group of the start signal and the stop signal. Therefore, when an error occurs in information sent after a start signal is sent, the information sent after the start signal is sent is resent (for example, if an error occurs in the address of the register of the peripheral device 3 sent by the host to the control device in Step 12, Step 11 and Step 12 may be re-performed, and Step 1 to Step 10 do not need to be re-performed), which effectively ensures timely correction when an error occurs in the information.

In the foregoing Embodiment 1, the host writes the indication information, the read command, and the address of the register of the target device into the control device, so that the control device may send the indication information, the read command, and the address of the register of the target device to the slave device by using one message. Then the slave device determines, based on the indication information, whether the target device is the slave device or the peripheral device connected to the slave device. In this way, data can be quickly read from the slave device or the peripheral device. The method has strong adaptability. For example, the method is applicable to various complex topologies. In addition, when the target device needs to be switched, the foregoing method may be performed again, and therefore switching efficiency is high.

Embodiment 2

Figure 6:
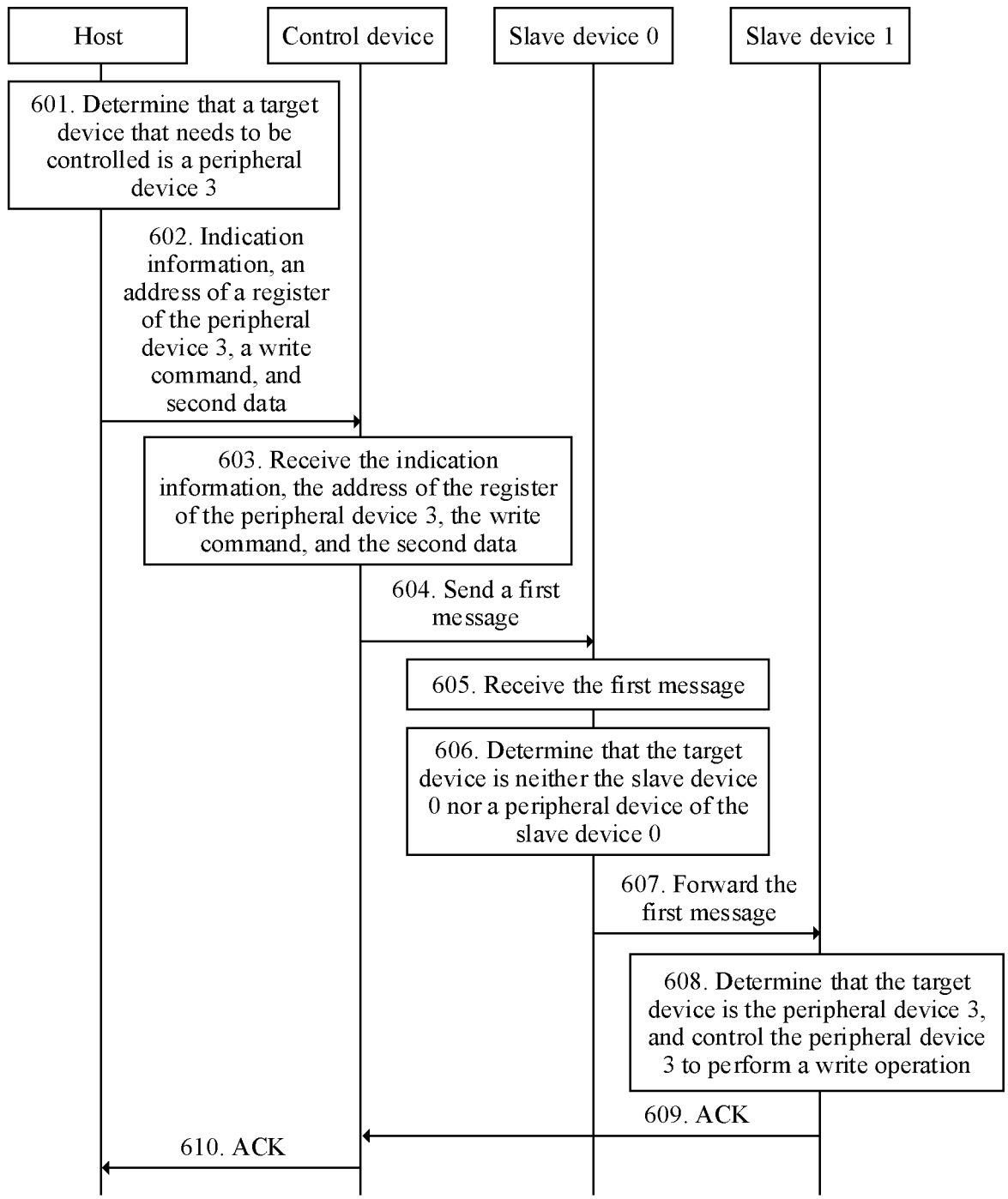
FIG. 6 is a schematic flowchart of a control method according to Embodiment 2 of this disclosure.

In Embodiment 2, a control method provided in this embodiment of this disclosure is described with reference to FIG. 6 by using an example in which the control command is a write command, and the target device is the peripheral device 3. FIG. 6 is a schematic flowchart of the control method according to this embodiment of this disclosure. As shown in FIG. 6, the method includes the following steps.

Step 601. The host determines that the target device that needs to be controlled is the peripheral device 3.

Step 602. The host sends the indication information, the write command, an address of a register of the peripheral device 3, and second data to the control device, where the indication information is used to indicate the peripheral device 3. Refer to Table 6. The indication information may include a byte 1 and a byte 2, where the byte 1 includes a number 1, and the byte 2 includes an index 2. The write command is used to write the second data into the register of the peripheral device 3, and the write command may be carried in the byte 1.

Correspondingly, in Step 603, the control device receives the indication information, the write command, the address of the register of the peripheral device 3, and the second data.

Step 604. The control device sends a first message to a slave device connected to the control device (that is, the slave device 0), where the first message includes the indication information, the address of the register of the peripheral device 3, the write command, and the second data.

Step 606. The slave device 0 receives the first message from the control device.

Step 606. The slave device 0 determines that the target device is neither the slave device 0 nor a peripheral device of the slave device 0.

Step 607. The slave device 0 forwards the first message to a lower-level transmission device of the slave device 0 (that is, the slave device 1).

Step 608. The slave device 1 determines that the target device is the peripheral device 3, and controls the peripheral device 3 to perform a write operation, that is, controls the peripheral device 3 to write the second data into the register of the peripheral device 3.

For a process in which the slave device 1 controls the peripheral device 3 to perform the write operation, refer to the foregoing I2C bus write process. Details are not described again.

Step 609. The slave device 1 sends response information (for example, an ACK) to the control device.

Step 610. The control device sends the response information (for example, an ACK) to the host.

For the foregoing Step 601 to Step 610, the following describes in detail the communication between the host and the control device in this embodiment. For example, the communication between the host and the control device may include the following steps.

Step 1. The host sends a start signal to the control device.

Step 2. The host sends the indication information, the control command (that is, the write command), the address of the register of the peripheral device 3, and the second data to the control device.

Step 3. The control device sends an ACK to the host.

Step 4. The host sends a stop signal to the control device.

The following describes, based on an I2C communication process, communication between the host and the control device in detail. For example, the following steps may be included.

Step 1. The host sends a start signal to the control device.

Step 2. The host sends an address of the control device and the write command to the control device, and waits for an ACK. The write command is used to control the control device to perform a write operation.

Step 3. The control device sends an ACK.

Step 4. The host sends an address of a register 1 of the control device to the control device, and waits for an ACK.

Step 5. The control device sends an ACK.

Step 6. The host sends the byte 1 to the control device, and waits for an ACK. The byte 1 may include the number 1 and the write command.

Step 7. The control device sends an ACK.

Herein, the control device may write the content carried in the byte 1 into the register 1.

Step 8. The host sends the byte 2 to the control device, and waits for an ACK. The byte 2 may include the index 2.

Step 9. The control device sends an ACK.

Herein, the control device may write the content carried in the byte 2 into a register 2 of the control device in sequence.

Step 10. The host sends the address of the register of the peripheral device 3 to the control device, and waits for an ACK.

Step 11. The control device sends an ACK.

Step 12. The host sends the second data to the control device, and waits for an ACK.

Herein, after receiving the indication information, the write command, the address of the register of the peripheral device 3, and the second data, the control device may perform Step 604 to Step 609.

Step 13. The control device sends an ACK, that is, the control device sends response information to the host.

Step 14. The host sends a stop signal to the control device.

In the foregoing Embodiment 2, the host writes the indication information, the write command, the address of the register of the target device, and the second data into the control device, so that the control device may send the indication information, the address of the register of the target device, the write command, and the second data to the slave device by using one message. Then the slave device determines, based on the indication information, whether the target device is the slave device or the peripheral device connected to the slave device. In this way, data can be quickly written into the slave device or the peripheral device. The method has strong adaptability. For example, the method is applicable to various complex topologies. In addition, when the target device needs to be switched, the foregoing method may be performed again, and therefore switching efficiency is high.

Embodiment 3

Figure 7:
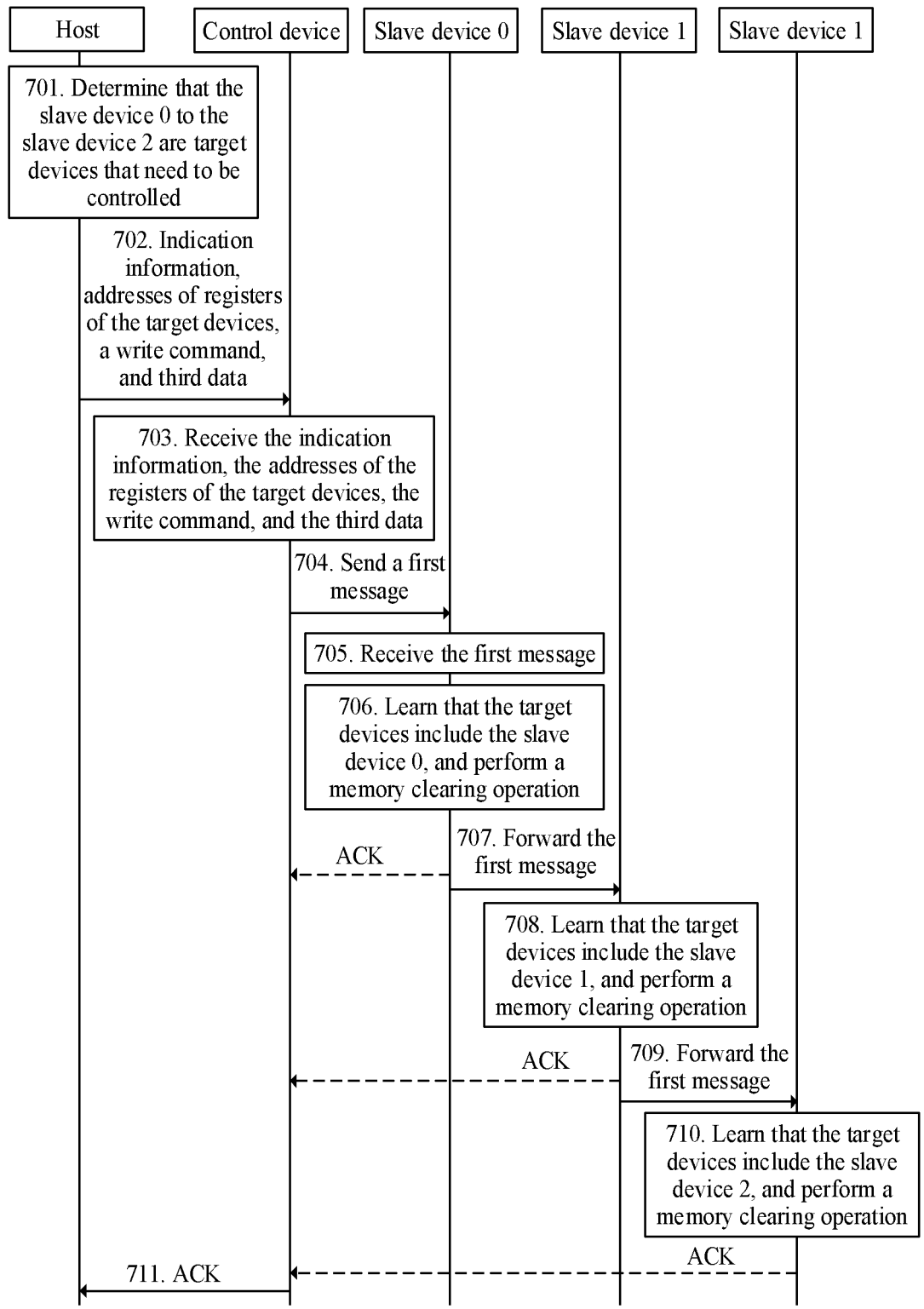
FIG. 7 is a schematic flowchart of a control method according to Embodiment 3 of this disclosure.

In Embodiment 3, the control method provided in this embodiment of this disclosure is described with reference to FIG. 7 by using an example in which the control command is a write command (control a target device to perform a memory clearing operation), and all the slave devices (for example, the slave device 0, the slave device 1, and the slave device 2) are target devices. FIG. 7 is a schematic flowchart of the control method according to this embodiment of this disclosure. As shown in FIG. 7, the method includes the following steps.

Step 701. The host determines that the slave device 0, the slave device 1, and the slave device 2 are the target devices that need to be controlled.

Step 702. The host sends the indication information, the write command, addresses of registers of the target devices (such as a control register 1 of the target device), and third data to the control device, where the indication information is used to indicate the slave device 0, the slave device 1, and the slave device 2. Refer to Table 6. The indication information may include bytes 1 and bytes 2, where the byte 1 includes a first preset number (for example, 3), and the byte 2 includes a second preset index (for example, 4). The write command is used to write the third data into the control register 1 of the target device, to control the target device to perform a memory clearing operation. The write command may be carried in the byte 1.

Correspondingly, in Step 703, the control device receives the indication information, the write command, the addresses of the registers of the target devices, and the third data.

Step 704. The control device sends a first message to a slave device connected to the control device (that is, the slave device 0), where the first message includes the indication information, the write command, the addresses of the registers of the target devices, and the third data.

Step 705. The slave device 0 receives the first message from the control device.

Step 706. The slave device 0 determines that the number carried in the indication information is the number 3, learns that the target devices include the slave device 0, and performs a memory clearing operation.

Step 707. The slave device 0 forwards the first message to a lower-level transmission device of the slave device 0 (that is, the slave device 1).

Step 708. The slave device 1 determines that the number carried in the indication information is the number 3, learns that the target devices include the slave device 1, and performs a memory clearing operation.

Step 709. The slave device 1 forwards the first message to a lower-level transmission device of the slave device 1 (that is, the slave device 2).

Step 710. The slave device 2 determines that the number carried in the indication information is the number 3, learns that the target devices include the slave device 2, and performs a memory clearing operation.

Step 711. The control device sends an ACK to the host.

It should be noted that, after performing the memory clearing operation, the slave device 0, the slave device 1, and the slave device 2 may all send ACKs to the control device. After receiving the ACKs from the slave device 0, the slave device 1, and the slave device 2, the control device may send the ACK to the host.

For the foregoing Step 701 to Step 711, the following describes in detail the communication between the host and the control device in this embodiment. For example, the communication between the host and the control device may include the following steps.

Step 1. The host sends a start signal to the control device.

Step 2. The host sends an address of the control device and the write command to the control device, and waits for an ACK. The write command is used to control the control device to perform a write operation.

Step 3. The control device sends an ACK.

Step 4. The host sends an address of a register 1 of the control device to the control device, and waits for an ACK.

Step 5. The control device sends an ACK.

Step 6. The host sends the byte 1 to the control device, and waits for an ACK. The byte 1 may include the number 3 and the write command.

Step 7. The control device sends an ACK.

Herein, the control device may write the content carried in the byte 1 into the register 1.

Step 8. The host sends the byte 2 to the control device, and waits for an ACK. The byte 2 may include the index 4.

Step 9. The control device sends an ACK.

Herein, the control device may write the content carried in the byte 2 into a register 2 of the control device in sequence.

Step 10. The host sends the addresses of the registers of the target devices to the control device, and waits for an ACK.

Step 11. The control device sends an ACK.

Step 12. The host sends the third data to the control device, and waits for an ACK.

Herein, after receiving the indication information, the write command, the addresses of the registers of the target devices, and the third data, the control device may perform Step 704 to Step 710.

Step 13. The control device sends an ACK, that is, the control device sends response information to the host.

Step 14. The host sends a stop signal to the control device.

In the foregoing Embodiment 3, the host writes the indication information, the write command, the addresses of the registers of the target devices, and the third data into the control device, so that the control device may send the indication information, the write command, the addresses of the registers of the target devices, and the third data to the slave devices by using one message. Then the slave devices determine, based on the indication information, whether the target device is the slave device or the peripheral device connected to the slave device. Because the target devices indicated by the indication information may include all the slave devices, quick control on all the slave devices can be implemented. This method is highly adaptable, for example, the method is applicable to various complex topologies.

It should be noted that: (1) Embodiment 1 to Embodiment 3 describe some possible implementations of embodiments of this disclosure. In another possible embodiment, for example, the control command may be a write command (control a target device to perform a reset operation). For another example, the target device may be another possible slave device or another possible peripheral device, or all slave devices and all peripheral devices may be the target devices. Details are not described exhaustively.

(2) A difference between Embodiment 1 to Embodiment 3 lies in that the control commands and/or the target devices are different. For content other than the difference, mutual reference may be made between Embodiment 1 to Embodiment 3.

(3) Embodiment 1 to Embodiment 3 are described by using an example in which the N peripheral devices are connected to at least one of the P slave devices (in other words, the control device is not connected to a peripheral device). In another possible embodiment, the control device may be connected to a peripheral device. When the control device is connected to the peripheral device, in a possible implementation, a number may be allocated to the control device, so that after the control device receives indication information (a byte 1 carries the number of the control device, and a byte 2 carries an address index of the peripheral device connected to the control device), if it is determined that the target device is the peripheral device connected to the control device, the peripheral device may be controlled to perform the first operation. Further, the control device may not send the first message to the slave device. Therefore, a transmission resource is saved. In still another possible implementation, the register of the control device may include a preset register (the preset register may include a plurality of registers). When the host writes an address of the target device (or an index of the address of the target device), the control command, and an address of the register of the target device into the preset register, it indicates that the target device that needs to be controlled is the peripheral device connected to the control device. Further, which peripheral device is connected to the control device may be determined based on the address of the target device.

The foregoing mainly describes the solutions provided in embodiments of this disclosure from a perspective of interaction between the host, the control device, and the slave device. It may be understood that, to implement the foregoing functions, the host, the control device, and the slave device may include corresponding hardware structures and/or software modules for performing the functions. A person skilled in the art should be easily aware that, with reference to units and algorithm steps in the examples described in embodiments disclosed in this specification, embodiments of this disclosure can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In embodiments of this disclosure, functional unit division may be performed on the host, the control device, and the slave device based on the foregoing method examples. For example, division into each functional unit may be based on each corresponding function, or two or more functions may be integrated into one unit. The integrated unit may be implemented in a form of hardware, or may be implemented in a form of a software functional unit.

Figure 8:
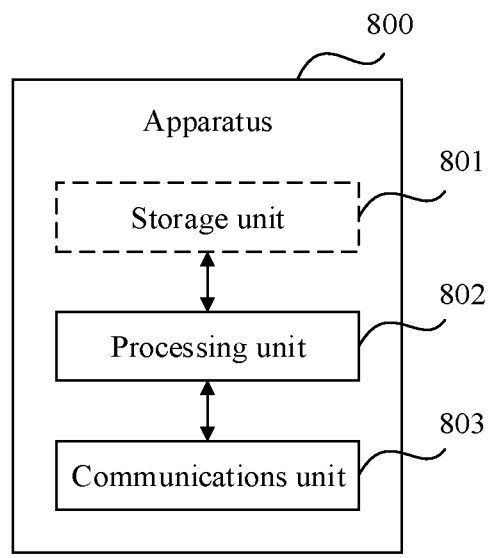
FIG. 8 is a block diagram of a possible example of an apparatus according to an embodiment of this disclosure.

When an integrated unit is used, FIG. 8 is a possible example block diagram of an apparatus according to an embodiment of this disclosure. As shown in FIG. 8, an apparatus 800 may include a processing unit 802 and a communications unit 803. The processing unit 802 is configured to control and manage an action of the apparatus 800. The communications unit 803 is configured to support communication between the apparatus 800 and another device. Optionally, the communications unit 803 is also referred to as a transceiver unit, and may include a receiving unit and/or a sending unit, which are respectively configured to perform a receiving operation and a sending operation. The apparatus 800 may further include a storage unit 801 configured to store program code and/or data of the apparatus 800.

The apparatus 800 may be the host (or a chip in the host) in any of the foregoing embodiments, and the host may be connected to a control device through an I²C bus. The processing unit 802 may support the apparatus 800 in performing an action of the host in the foregoing method examples, or the processing unit 802 mainly performs an internal action of the host in the method examples. The communications unit 803 may support communication between the apparatus 800 and the control device.

In an embodiment, the processing unit 802 is configured to determine a target device that needs to be controlled, where the target device includes at least one of P slave devices and/or at least one of N peripheral devices, and at least one of the P slave devices and the control device is connected to the N peripheral devices, and the communications unit 803 is configured to send a start signal to the control device, send indication information, a control command, and an address of a register of the target device to the control device, where the indication information is used to indicate the target device, and the control command is a read command or a write command, and send a stop signal to the control device. P and N are integers greater than or equal to 1.

In a possible design, the target device is a first peripheral device in the N peripheral devices, and the indication information includes an identifier of a device connected to the first peripheral device, and further includes an index of an address of the first peripheral device or the address of the first peripheral device.

In a possible design, the target device is a first slave device in the P slave devices, and the indication information includes an identifier of the first slave device.

In a possible design, the indication information further includes a preset index or a preset address.

In a possible design, the processing unit 802 is configured to obtain mapping relationship information, where the mapping relationship information includes a mapping relationship between identifier information, index information, and address information, or the mapping relationship information includes a mapping relationship between the identifier information and the address information, where the identifier information includes identifiers of the P slave devices, the index information includes indexes of addresses of the N peripheral devices, and the address information includes the addresses of the N peripheral devices, and the communications unit 803 is configured to send the indication information to the control device based on the mapping relationship information.

In a possible design, when the mapping relationship information includes the mapping relationship between the identifier information, the index information, and the address information, an identifier of each slave device of the P slave devices, an address of a peripheral device connected to the slave device, and an index of the address of the peripheral device connected to the slave device correspond, or when the mapping relationship information includes the mapping relationship between the identifier information and the address information, the identifier of each slave device of the P slave devices and the address of the peripheral device connected to the slave device correspond.

In a possible design, the index information further includes a preset index, and the address information further includes a preset address.

In a possible design, if the control command is the read command, before sending a stop signal to the control device, the communications unit 803 is further configured to receive first data sent by the control device, where the first data is data from the target device. If the control command is the write command, before sending a stop signal to the control device, the communications unit 803 is further configured to send second data to the control device.

The apparatus 800 may be the control device (or a chip in the control device) in any of the foregoing embodiments, and the control device may be connected to the host through an I²C bus. The processing unit 802 may support the apparatus 800 in performing an action of the control device in the foregoing method examples, or the processing unit 802 mainly performs an internal action of the control device in the method examples. The communications unit 803 may support communication between the apparatus 800 and other devices (such as the host and the slave device).

In an embodiment, the communications unit 803 is configured to receive indication information, a control command, and an address of a register of a target device from the host, where the indication information is used to indicate the target device, the control command is a read command or a write command, the target device includes at least one of P slave devices and/or at least one of N peripheral devices, and the N peripheral devices are connected to at least one of the P slave devices, and send a first message to a slave device connected to the control device, where the first message includes the indication information, the control command, and the address of the register of the target device. P and N are integers greater than or equal to 1.

In a possible design, the target device is a first peripheral device in the N peripheral devices, and the indication information includes an identifier of a device connected to the first peripheral device, and further includes an index of an address of the first peripheral device or the address of the first peripheral device.

In a possible design, the processing unit 802 is configured to write the identifier of the device connected to the first peripheral device and the control command into a same register, or write the index of the address of the first peripheral device or the address of the first peripheral device and the control command into a same register.

In a possible design, the target device is a first slave device in the P slave devices, and the indication information includes an identifier of the first slave device.

In a possible design, the indication information further includes a preset index or a preset address.

In a possible design, the processing unit 802 is configured to write the identifier of the first slave device and the control command into a same register, or write the preset index or the preset address and the control command into a same register.

In a possible design, the communications unit 803 is further configured to receive a start signal from the host, receive the indication information, the control command, and the address of the register of the target device from the host, and receive a stop signal from the host.

In a possible design, if the control command is the read command, the communications unit 803 is further configured to receive first data from the target device, and send the first data to the host, or if the control command is the write command, the communications unit 803 is further configured to receive second data from the host, where the first message further includes the second data.

The apparatus 800 may be the slave device (or a chip in the slave device) in any of the foregoing embodiments. The processing unit 802 may support the apparatus 800 in performing an action of the slave device in the foregoing method examples, or the processing unit 802 mainly performs an internal action of the slave device in the method examples. The communications unit 803 may support communication between the apparatus 800 and other devices (such as the control device and a lower-level transmission device or an upper-level transmission device of the slave device).

In an embodiment, the communications unit 803 is configured to receive a first message from a control device, where the first message includes indication information, a control command, and an address of a register of a target device, the indication information is used to indicate the target device, the control command is a read command or a write command, the target device includes at least one of P slave devices and/or at least one of N peripheral devices, the N peripheral devices are connected to at least one of the P slave devices, and a first slave device is any of the P slave devices, and the processing unit 802 is configured to, if it is determined that the target device is the first slave device, perform a first operation based on the control command. P and N are integers greater than or equal to 1.

In a possible design, the processing unit 802 is further configured to, if it is determined that the indication information includes an identifier of the first slave device and a preset index or a preset address, determine that the target device is the first slave device.

In a possible design, the processing unit 802 is further configured to, if it is determined that the target device is a first peripheral device connected to the first slave device, control the first peripheral device to perform the first operation.

In a possible design, the processing unit 802 is further configured to, if it is determined that the indication information includes the identifier of the first slave device and an index of an address of the first peripheral device or the address of the first peripheral device, determine that the target device is the first peripheral device.

In a possible design, if the control command is the write command, the first message further includes second data.

In a possible design, if the control command is the write command, the first operation is at least one of a write operation, a memory clearing operation, or a read operation.

In a possible design, connections between the control device and the P slave devices form a daisy chain topology, or a ring topology, or a tree topology.

It should be understood that unit division of the foregoing apparatus is merely logical function division. During actual implementation, all or some of the units may be integrated into one physical entity, or may be physically separated. In addition, all the units in the apparatus may be implemented in a form of software invoked by a processor element, or may be implemented in a form of hardware, or some units may be implemented in a form of software invoked by a processor element, and some units may be implemented in a form of hardware. For example, the units may be separately disposed processor elements, or may be integrated into a chip of the apparatus. In addition, the units may be stored in a memory in a program form, and is invoked by a processor element of the apparatus to perform functions of the units. In addition, all or some of the units may be integrated, or may be implemented independently. The processor element herein may also be referred to as a processor, and may be an integrated circuit having a signal processing capability. During implementation, steps in the foregoing methods or the foregoing units may be implemented by using a hardware integrated logic circuit in the processor element, or may be implemented in a form of software invoked by the processor element.

For example, a unit in any one of the foregoing apparatuses may be one or more integrated circuits configured to implement the foregoing method, for example, one or more ASICs, one or more microprocessors (e.g., DSPs), one or more field-programmable gate arrays (FPGAs), or a combination of at least two of the integrated circuits. For another example, when the unit in the apparatus is implemented by scheduling a program by a processor element, the processor element may be a processor, for example, a general-purpose CPU or another processor that can invoke the program. For another example, the units may be integrated and implemented in a form of a system-on-a-chip (SOC).

The foregoing receiving unit is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 9:
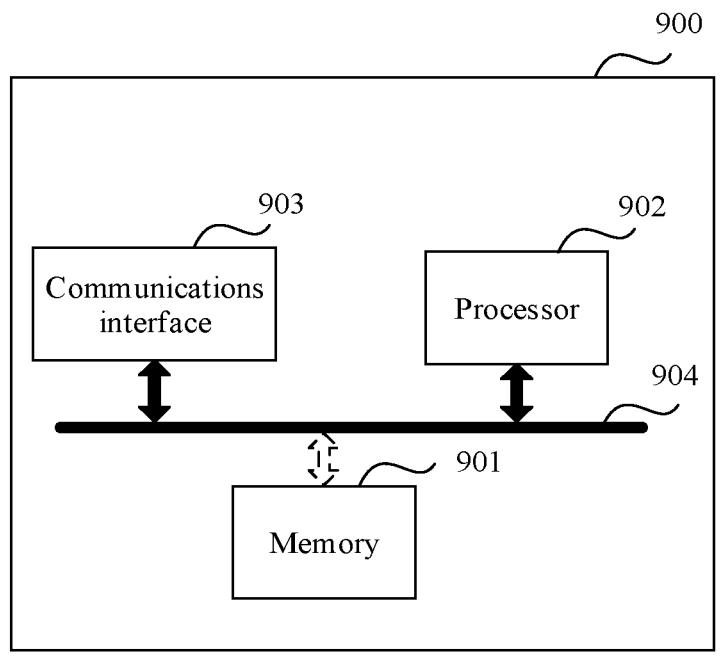
FIG. 9 is a schematic diagram of a control apparatus according to an embodiment of this disclosure.

FIG. 9 is a schematic diagram of a control apparatus according to an embodiment of this disclosure. An apparatus 900 may be the host, the control device, or the slave device in the foregoing embodiments. The apparatus 900 includes a processor 902 and a communications interface 903, and may further include a memory 901, or the processor 902 and the communications interface 903 are coupled to the memory 901. Optionally, the apparatus 900 may further include a communications line 904. The communications interface 903, the processor 902, and the memory 901 may be connected by the communications line 904. The communications line 904 may be a Peripheral Component Interconnect (PCI) bus, an Extended Industry Standard Architecture (EISA) bus, or the like. The communications line 904 may be classified into an address bus, a data bus, a control bus, and the like. For ease of representation, only one thick line is used to represent the bus in FIG. 9, but this does not mean that there is only one bus or only one type of bus.

The processor 902 may be a CPU, a microprocessor, an ASIC, or one or more integrated circuits configured to control program execution in the solutions of this disclosure. A function of the processor 902 may be the same as a function of the processing unit described in FIG. 8.

The communications interface 903 is any apparatus such as a transceiver, and is configured to communicate with another device or a communications network, such as the Ethernet, a radio access network (RAN), a wireless local area network (WLAN), or a wired access network. A function of the communications interface 903 may be the same as a function of the communications unit described in FIG. 8.

The memory 901 may be a read-only memory (ROM) or another type of static storage device that can store static information and instructions, or a random-access memory (RAM) or another type of dynamic storage device that can store information and instructions, or may be an electrically erasable programmable ROM (EEPROM), a compact disc (CD) ROM (CD-ROM) or another compact disc storage, an optical disc storage (including a CD, a laser disc, an optical disc, a DIGITAL VERSATILE DISC (DVD), a BLU-RAY disc, and the like), a magnetic disk storage medium or another magnetic storage device, or any other medium that can be configured to carry or store expected program code in a form of instructions or a data structure and that can be accessed by a computer. However, the memory 901 is not limited thereto. The memory may exist independently, and is connected to the processor by the communications line 904. Alternatively, the memory may be integrated with the processor. A function of the memory 901 may be the same as that of the storage unit described in FIG. 8.

The memory 901 is configured to store computer-executable instructions for executing the solutions in this disclosure, and the processor 902 controls execution of the computer-executable instructions. The processor 902 is configured to execute the computer-executable instructions stored in the memory 901, to implement the methods provided in the foregoing embodiments of this disclosure.

Optionally, the computer-executable instructions in this embodiment of this disclosure may also be referred to as application code. This is not limited in this embodiment of this disclosure.

An embodiment of this disclosure further provides a computer-readable storage medium configured to store computer software instructions that need to be executed by the processor, and the computer software instructions include a program that needs to be executed by the foregoing processor.

In embodiments of this disclosure, the term "and/or" describes an association relationship between associated objects and may indicate three relationships. For example, A and/or B may indicate the following cases: only A exists, both A and B exist, and only B exists, where A and B may be singular or plural. The character "/" usually indicates an "or" relationship between associated objects. In addition, unless otherwise stated, ordinal numbers such as "first" and "second" in embodiments of this disclosure are used to distinguish between a plurality of objects, and are not used to limit an order, a time sequence, priorities, or importance of the plurality of objects. For example, first data and second data are merely intended to distinguish between different pieces of data, but do not indicate that the two pieces of data are different in priority, importance, or the like.

A person skilled in the art should understand that embodiments of this disclosure may be provided as a method, a system, or a computer program product. Therefore, this disclosure may use a form of a hardware-only embodiment, a software-only embodiment, or an embodiment with a combination of software and hardware. Moreover, this disclosure may use a form of a computer program product that is implemented on one or more computer-usable storage media (including but not limited to a disk memory, a CD-ROM, an optical memory, and the like) that include computer usable program code.

This disclosure is described with reference to the flowcharts and/or block diagrams of the method, the device (system), and the computer program product according to this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the other programmable device, to generate computer-implemented processing. Therefore, the instructions executed on the computer or the other programmable device provide steps for implementing a specified function in one or more processes in the flowcharts and/or in one or more blocks in the block diagrams.

It is clear that a person skilled in the art can make various modifications and variations to this disclosure without departing from the spirit and scope of this disclosure. This disclosure is intended to cover these modifications and variations of this disclosure provided that they fall within the scope defined by the following claims and their equivalent technologies.

What is claimed is:

1. A method implemented by a host configured to couple to a control device through an Inter-Integrated Circuit ($I^2C$) bus, wherein the method comprises:
   determining, by the host, a target device to be controlled, wherein the target device is a first peripheral device of N peripheral devices, wherein N is an integer greater than or equal to one;
   sending, to the control device, a start signal for commencing I2C bus communication;
   sending, to the control device, indication information indicating the target device, a control command, and a first address of a register of the target device, wherein the control command is either a read command or a write command, and wherein the indication information comprises:
      an identifier of a first slave device coupled to the first peripheral device; and
      an index of a second address of the first peripheral device or the second address; and
   sending, to the control device, a stop signal for terminating I2C bus communication.

2. The method of claim 1, further comprising:
   obtaining mapping relationship information comprising a first mapping relationship among identifier information, index information, and address information, wherein the identifier information comprises identifiers of P slave devices, wherein the index information comprises first indexes of second addresses of the N peripheral devices, wherein P is an integer greater than or equal to one, and wherein the address information comprises the second addresses; and
   sending, to the control device based on the mapping relationship information, the indication information.

3. The method of claim 2, wherein an identifier of each of the P slave devices, a third address of a peripheral device coupled to each of the P slave devices, and a second index of the third address correspond to each other.

4. The method of claim 2, wherein the index information further comprises a preset index, and wherein the address information further comprises a preset address.

5. The method of claim 1, wherein before sending the stop signal, the method further comprises:
   receiving, from the control device, first data of the target device when the control command is the read command; and
   sending, to the control device, second data when the control command is the write command.

6. A method implemented by a control device, wherein the method comprises:
   receiving, from a host configured to couple to the control device through an Inter-Integrated Circuit ($I^2C$) bus, indication information, a control command, and a first address of a register of a target device, wherein the target device is a first peripheral device of N peripheral devices, wherein N is an integer greater than or equal to one, wherein the indication information indicates the target device, wherein the control command is either a read command or a write command, and wherein the indication information comprises:
      an identifier of a first slave device coupled to the first peripheral device; and
      an index of a second address of the first peripheral device or the second address; and
   sending, to a slave device coupled to the control device, a first message comprising the indication information, the first address, and the control command.

7. The method of claim 6, further comprising writing, into the register, the identifier and the control command, the second address and the control command, or the index.

8. The method of claim 6, further comprising:
   receiving, from the host, a start signal before receiving the indication information, the control command, and the first address; and
   receiving, from the host, a stop signal after receiving the indication information, the control command, and the first address.

9. The method of claim 6, further comprising:
   when the control command is the read command:
      receiving, from the target device, first data; and
      sending, to the host, the first data; and
   receiving, from the host, second data when the control command is the write command, wherein the first message further comprises the second data.

10. A control method implemented by a first slave device, wherein the method comprises:
    receiving, from a control device, a first message comprising indication information, a control command, and a first address of a register of a target device, wherein the indication information indicates the target device, wherein the control command is a read command or a write command;
    identifying that the indication information comprises an identifier of the first slave device and an index of a second address of a first peripheral device coupled to the first slave device or the second address;
    determining, in response to identifying that the indication information comprises the identifier and the index or the second address, that the target device is the first peripheral device; and
    performing, based on the control command, a first operation when the target device is the first slave device.

11. The method of claim 10, further comprising controlling the first peripheral device to perform the first operation.

12. The method of claim 10, further comprising:
    sending, to the control device, first data when the control command is the read command; and
    receiving, from the control device, second data when the control command is the write command, wherein the first message further comprises the second data.

13. The method of claim 10, further comprising obtaining mapping relationship information comprising a second mapping relationship between identifier information and address information, wherein the identifier information comprises identifiers of P slave devices, wherein P integers is greater than or equal to one, and wherein the address information comprises second addresses of N peripheral devices, wherein an identifier of each of the P slave devices and a third address of a peripheral device coupled to each of the P slave devices correspond to each other.

14. The method of claim 1, further comprising:
    obtaining mapping relationship information comprising a second mapping relationship between identifier information and address information, wherein the identifier information comprises identifiers of P slave devices, wherein P integers is greater than or equal to one, and wherein the address information comprises second addresses of the N peripheral devices; and
    sending, to the control device based on the mapping relationship information, the indication information.

15. The method of claim 14, wherein an identifier of each of the P slave devices and a third address of a peripheral device coupled to each of the P slave devices correspond to each other.

16. The method of claim 14, wherein each slave device stores the second mapping relationship.

17. The method of claim 2, wherein the host stores the first mapping relationship.

18. The method of claim 2, wherein each of the P slave devices is coupled to a plurality of peripheral devices of the N peripheral devices, wherein the second address of the first peripheral device is unique within the plurality of peripheral devices coupled to the first slave device, and wherein the second address of the first peripheral device is not unique within the N peripheral devices.

19. The method of claim 2, wherein the second addresses of the N peripheral devices are in one-to-one correspondences with the first indexes of the second addresses.

20. The method of claim 1, wherein the indication information comprises the identifier of the first slave device in a first byte and the index of the second address in a second byte.

\* \* \* \* \*